US012660073B2

(12) United States Patent
Caiafa et al.

(10) Patent No.: US 12,660,073 B2
(45) Date of Patent: Jun. 16, 2026

(54) SYSTEMS AND METHODS FOR AN X-RAY TUBE

(71) Applicant: GE Precision Healthcare LLC, Waukesha, WI (US)

(72) Inventors: Antonio Caiafa, Waukesha, WI (US); Alexander Ryan, West Milwaukee, WI (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 236 days.

(21) Appl. No.: 18/656,450

(22) Filed: May 6, 2024

(65) Prior Publication Data

US 2025/0344310 A1 Nov. 6, 2025

(51) Int. Cl.

*H05G 1/54* (2006.01)
*H05G 1/02* (2006.01)
*H05G 1/10* (2006.01)

(52) U.S. Cl.

CPC ............... *H05G 1/54* (2013.01); *H05G 1/025* (2013.01); *H05G 1/10* (2013.01)

(58) Field of Classification Search

None

See application file for complete search history.

(56) References Cited

U.S. PATENT DOCUMENTS

| | | | | |
|---|---|---|---|---|
| 7,522,705 | B2 * | 4/2009 | Katcha | A61B 6/56 378/102 |
| 9,449,783 | B2 | 9/2016 | Hunt et al. | |
| 2012/0027161 | A1 * | 2/2012 | Abenaim | A61B 6/4233 378/103 |
| 2015/0036786 | A1 * | 2/2015 | Katcha | A61B 6/56 378/104 |
| 2015/0085969 | A1 * | 3/2015 | Mekonnen | H05G 1/10 378/4 |
| 2022/0280130 | A1 * | 9/2022 | Maji | A61B 6/032 |

* cited by examiner

*Primary Examiner* — Marcus H Taningco

(74) *Attorney, Agent, or Firm* — McCoy Russell LLP

(57) ABSTRACT

Methods and systems are provided for preventing hot landings of a motor of an X-ray imaging system in the event of a power loss. In an example, a method for an X-ray tube of an imaging system includes, during a scan of a subject with the imaging system, supplying energy from a main power supply to the X-ray tube in order to rotate a target of the X-ray tube, selectively recovering energy from the X-ray tube and storing the recovered energy in an energy storage circuit of the imaging system, and detecting a loss of the main power supply, and in response, supplying energy from the energy storage circuit to the X-ray tube in order to rotate the target at a threshold speed.

20 Claims, 17 Drawing Sheets

SYSTEMS AND METHODS FOR AN X-RAY TUBE

TECHNICAL FIELD

Embodiments of the subject matter disclosed herein relate to imaging systems and methods, and more particularly, to control of a rotatable assembly of an X-ray tube in computerized tomography (CT) imaging systems.

BACKGROUND

In computed tomography (CT) imaging systems, an electron beam generated by a cathode is directed towards a target within an X-ray source or X-ray tube. A fan-shaped or cone-shaped beam of X-rays produced by electrons colliding with the target is directed towards a subject, such as a patient. After being attenuated by the object, the X-rays impinge upon an array of X-ray detectors, generating an image. In some examples, the target may be configured to rotate so that the focal spot of the target is struck by the electron beam periodically rather than continuously, which may disperse the resultant thermal energy. In some examples, the target may be an anode.

SUMMARY

In an example, a method for an X-ray tube of an imaging system may include supplying energy from a main power supply to the X-ray tube in order to rotate a target of the X-ray tube during a scan of a subject with the imaging system; selectively recovering energy from the X-ray tube and storing the recovered energy in an energy storage circuit of the imaging system; and detecting a loss of the main power supply, and in response, supplying energy from the energy storage circuit to the X-ray tube in order to rotate the target at a threshold speed.

The above advantages and other advantages and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

DETAILED DESCRIPTION

Figure 1:
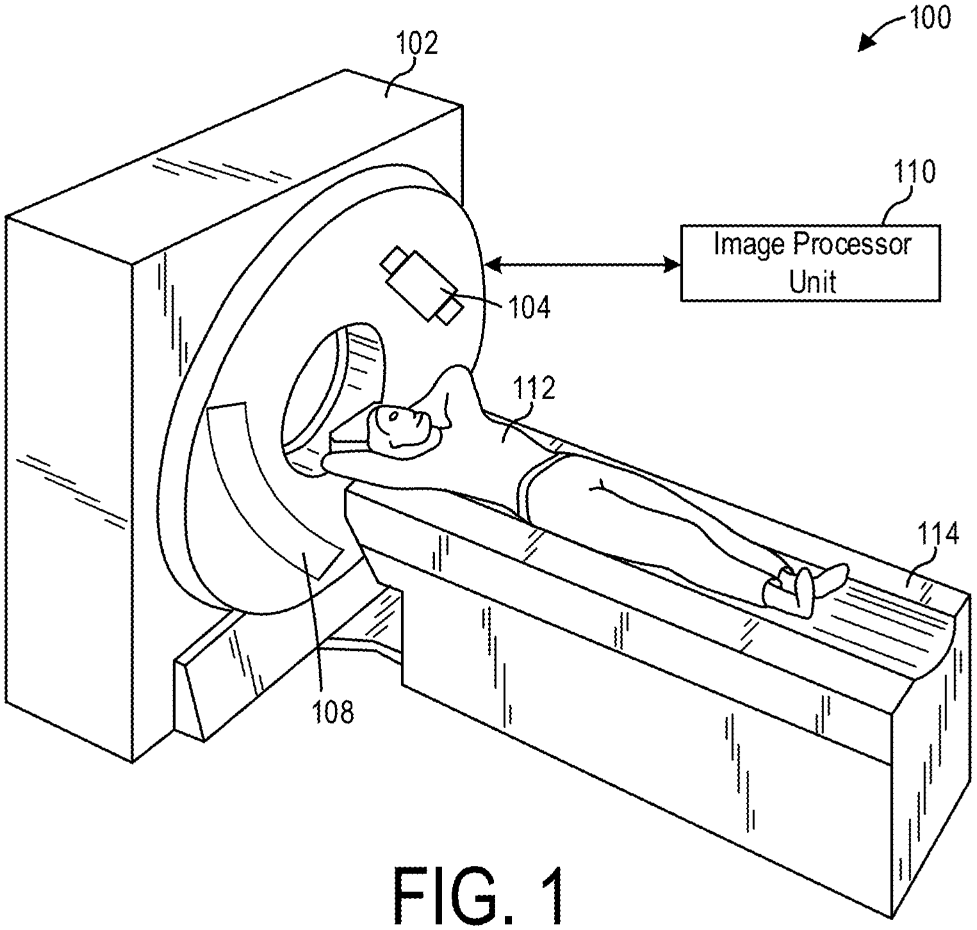
FIG. 1 shows a pictorial view of a computed tomography (CT) imaging system, in accordance with one or more embodiments of the present disclosure.

This description and embodiments of the subject matter disclosed herein relate to methods and systems for storing energy generated from a rotatable assembly of an X-ray tube within an X-ray generator and using the stored energy to sustain the rotation of the rotatable assembly and the functionality of a cooling system in the event that the X-ray generator loses power from a main power supply. The X-ray generator may be part of an imaging system such as a computed tomography (CT) imaging system. During imaging with the imaging system (e.g., with the CT system), an X-ray exposure may be performed via the X-ray generator. The X-ray exposure may include a beam of X-rays being generated by the X-ray generator (e.g., by the X-ray tube) and aimed at a subject. The X-rays may be attenuated by the subject and measured by an X-ray detector. In a CT system, a narrow beam of X-rays is generated by the X-ray tube, and the X-ray tube and the X-ray detector are rotated around a subject to obtain a plurality of views that may be reconstructed into one or more images.

In some examples, the X-ray tube may include a rotatable assembly that is rotated at high frequencies by a motor. The motor may include a rotating bearing component called the sleeve, a stationary bearing component called the shaft, a rotor, and a stationary stator. The X-ray tube/motor may thus include a rotatable assembly that includes a target, such as an anode, the sleeve, and the rotor. The motor may rotate the target at high speeds (e.g., greater than 50 Hz) and may rise in temperature during an X-ray exposure. The rotatable assembly may be supported by a liquid metal bearing (LMB), which may absorb and dissipate excess heat. The LMB may experience a large increase in temperature during an X-ray exposure. If the rotatable assembly is allowed to stop rotating ("land") when the LMB temperature is high, the LMB may transfer excessive amounts of energy to a particular region of the LMB and the rotating portion of the bearing (e.g., the rotor sleeve) may fuse to the stationary portion of the bearing. A rotor ceasing to rotate while the LMB temperature is high may be referred to as a hot landing. Fusing the bearing shaft to the bearing sleeve renders the motor inoperable and the X-ray tube may be replaced to restore the X-ray generation system to an operable condition. The X-ray tube is one of the most expensive components of a CT system, and preventing X-ray tube replacements may save money.

A hot landing may occur during a power outage or if the X-ray generator is unplugged during operation. In some cases, the X-ray generator may not include a backup power system to power a cooling system integrated into the X-ray generation system or maintain the rotation of the rotatable assembly and LMB. Maintaining power to a coolant pump and keeping the rotatable assembly rotating until the LMB has cooled to a suitable temperature may prevent the sleeve from fusing to the shaft.

Thus, according to embodiments disclosed herein, a hot landing may be prevented by an energy recovery, storage, and distribution system of an X-ray-based imaging system, such as a CT system. The energy recovery, storage, and distribution system may include a motor/generator and a self-contained hot landing protection system. The motor/generator may be configured to rotate a target of a rotatable assembly of an X-ray tube of the imaging system when supplied energy. During certain conditions, such as when the rotatable assembly is spinning down, the motor/generator may convert the mechanical energy of the rotatable assembly to electrical energy. The electrical energy generated by the motor/generator may be stored in the self-contained hot landing protection system and distributed to prevent hot landings. The self-contained hot landing protection system may include an energy storage circuit and hardware to facilitate distribution of the electrical energy to the motor and to a pump of a cooling system configured to cool the motor. Storing mechanical energy from the rotatable assembly as electrical energy during operation of the X-ray tube may allow the stored electrical energy to be used to rotate the rotatable assembly and power the pump of the cooling system in the event of a power outage. In some example systems, energy from the rotatable assembly may be recovered during every instance of speed reduction of the rotatable assembly, while in other examples, energy from the rotatable assembly may only be recovered and used when there is a power outage to the system. In examples where the imaging system includes or is coupled to an uninterruptible power supply (UPS), the energy recovery, storage, and distribution system may work in parallel with the UPS to provide power to cooling systems and the motor while the UPS provides energy to other components of the imaging system. The system and methods to store and use power to prevent hot landings described in more detail below may prevent the bearing sleeve from fusing to the shaft, which prevents X-ray tube replacements.

Figure 2:
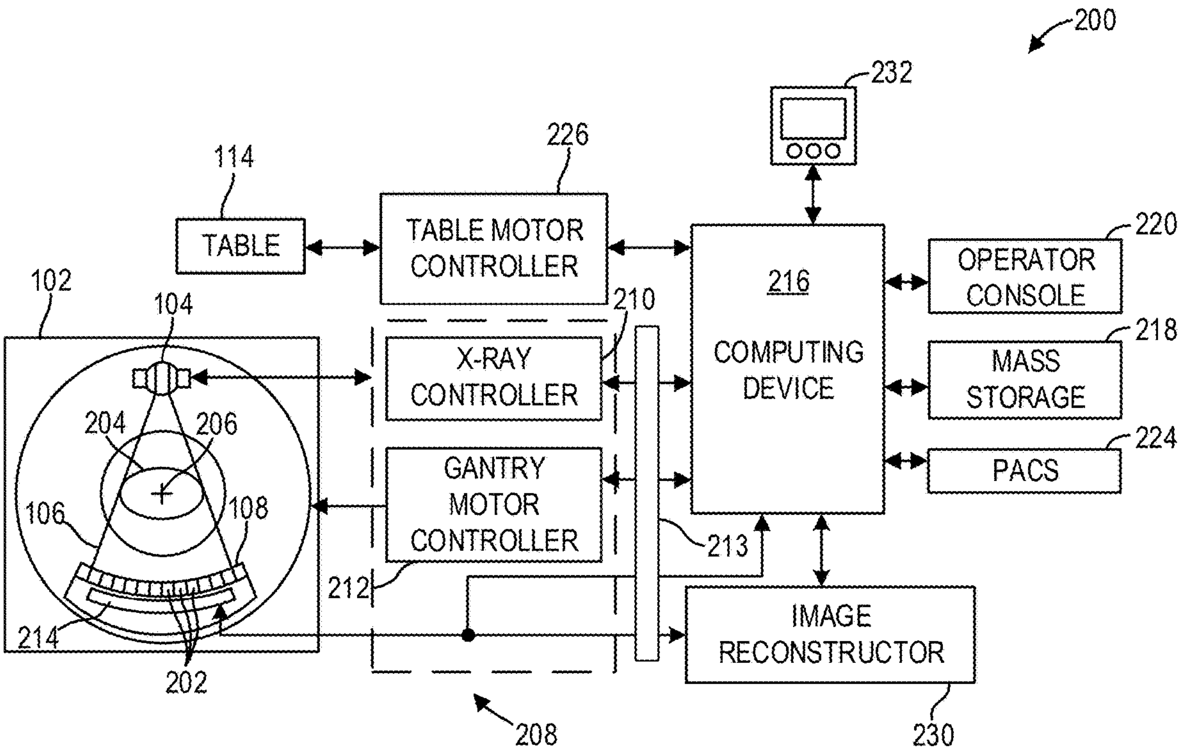
FIG. 2 shows a block schematic diagram of an example CT imaging system, in accordance with one or more embodiments of the present disclosure.
Figure 6:
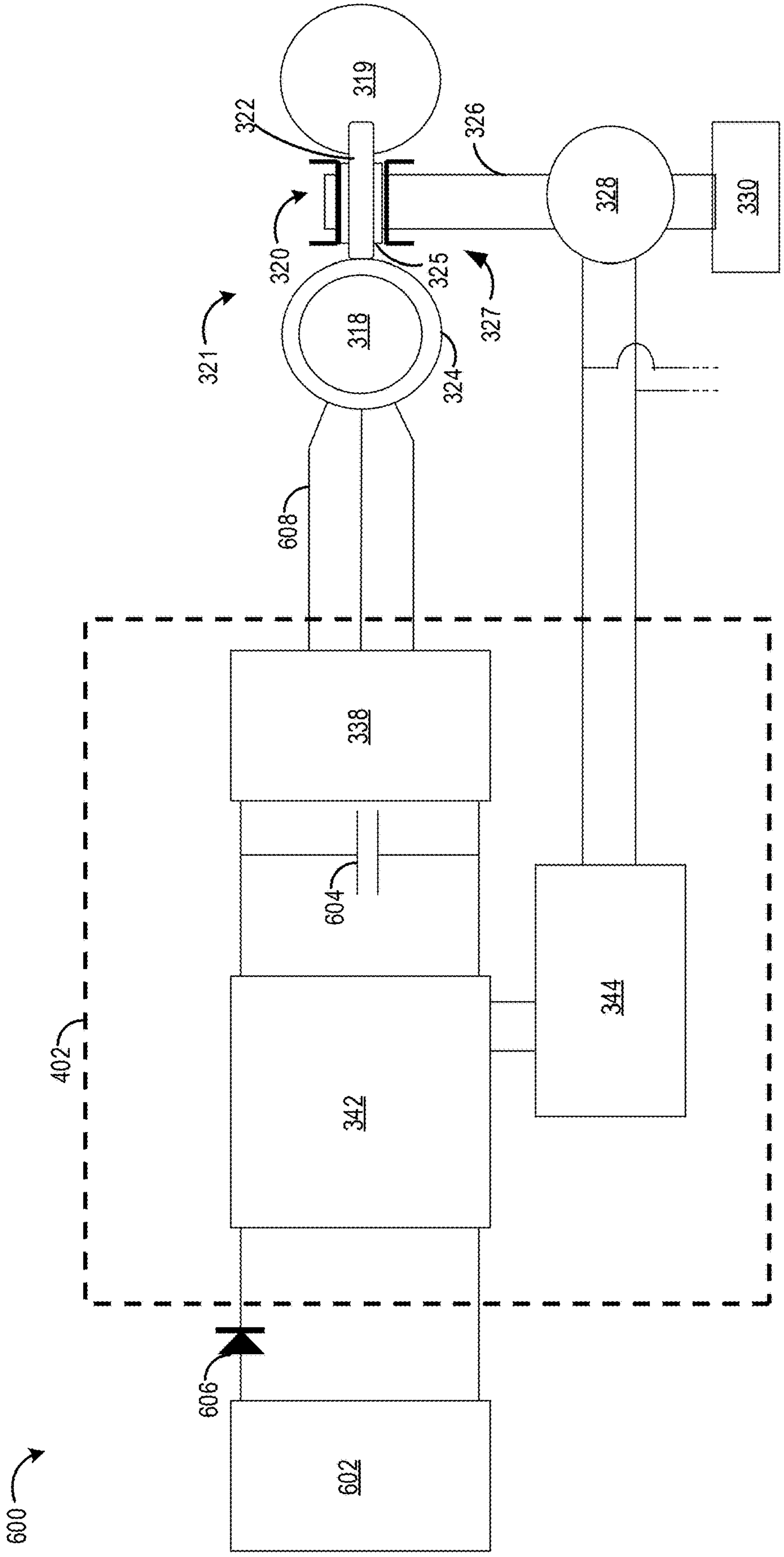
FIG. 6 is a schematic figure of a first example hardware arrangement of a self-contained hot landing protection system including an energy storage and recovery system.
Figure 7:
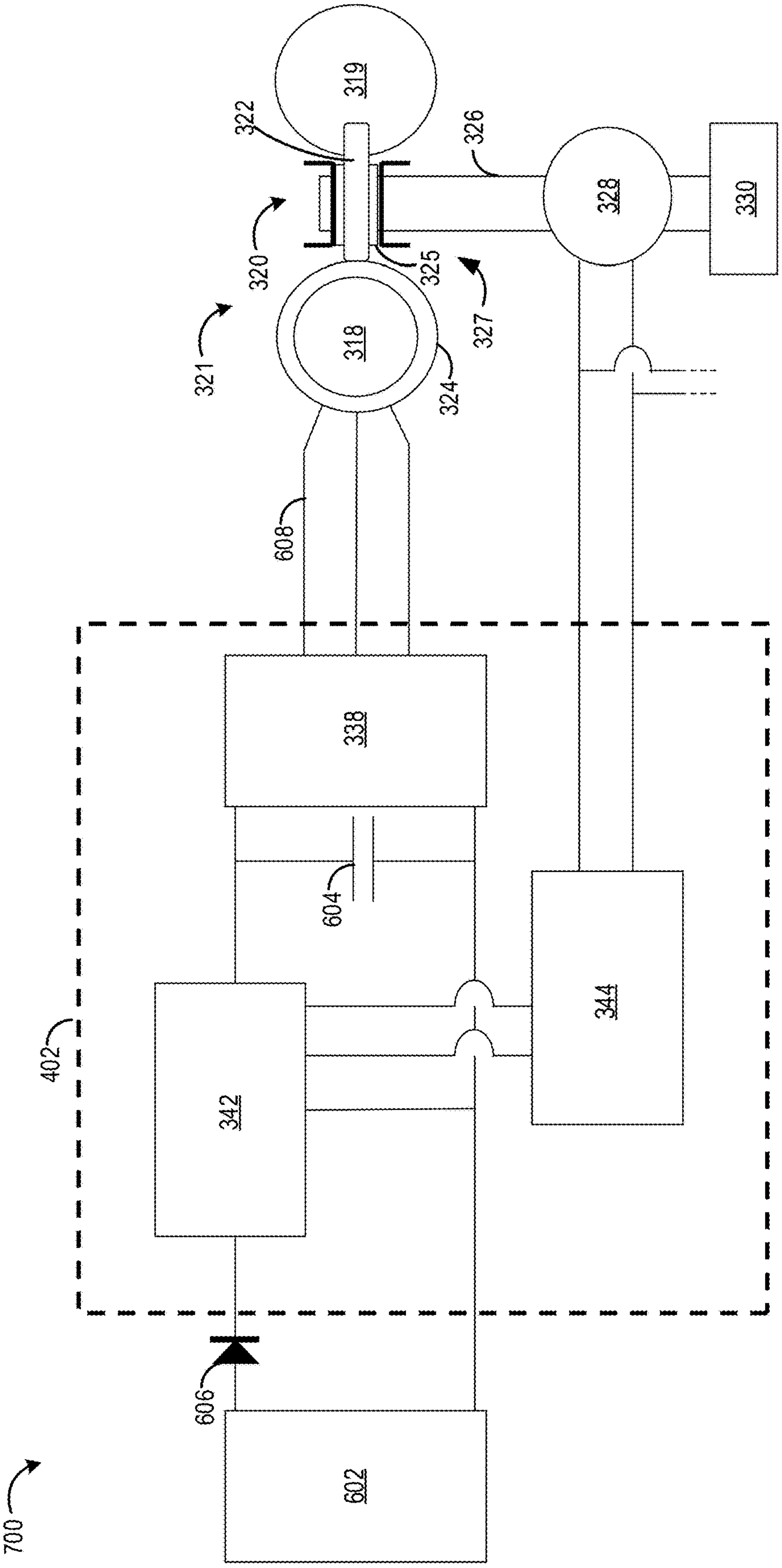
FIG. 7 is a schematic figure of a second example hardware arrangement of a self-contained hot landing protection system.
Figure 8:
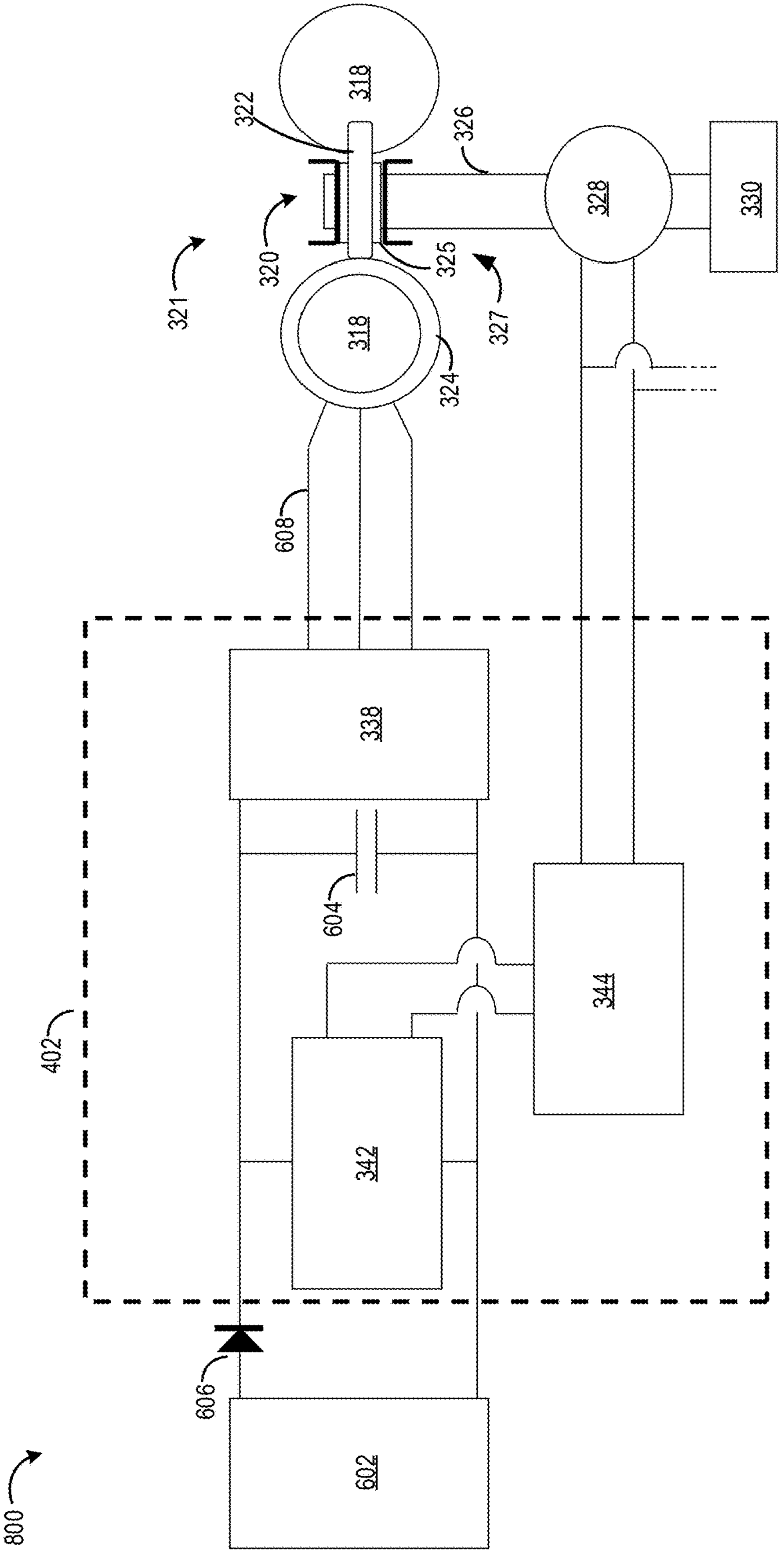
FIG. 8 is a schematic figure of a third example hardware arrangement of a self-contained hot landing protection system.

As explained above, the energy recovery, storage, and distribution system may be included as part of an X-ray system of a computed tomography (CT) system. An example of a CT system is shown in FIGS. 1 and 2. The energy recovery, storage, and distribution system may be integrated into a CT system in a plurality of arrangements, shown in FIGS. 3-5. Various electrical coupling arrangements between the self-contained hot landing protection system, the motor, and additional components of the CT system are shown in FIGS. 6-8. A first energy recovery strategy includes recovering energy from the rotor every time the rotor slows down following an X-ray exposure. An X-ray exposure may be a period of time where X-rays are being produced, and the X-rays are typically aimed at a subject and measured by a detector array. During an exposure, a gantry containing an X-ray generator, X-ray tube, X-ray detector, and associated power electronics may be rotated about a target to capture a plurality of views. Under a first energy recovery strategy, stored energy may be used to accelerate the rotatable assembly to an appropriate speed during a predetermined period of time before an exposure occurs. In some examples, the predetermined period of time may be between 1 s and 10 s or longer, though it is to be appreciated that the rotatable assembly may be accelerated to the appropriate speed well before the exposure actually begins. When an exposure ends there may be a predetermined delay between the end of the exposure and the beginning of the energy recovery sequence. In one example, the delay may be between 1 s and 10 s or more, depending on when the rotatable assembly deceleration occurs.

Figure 9:
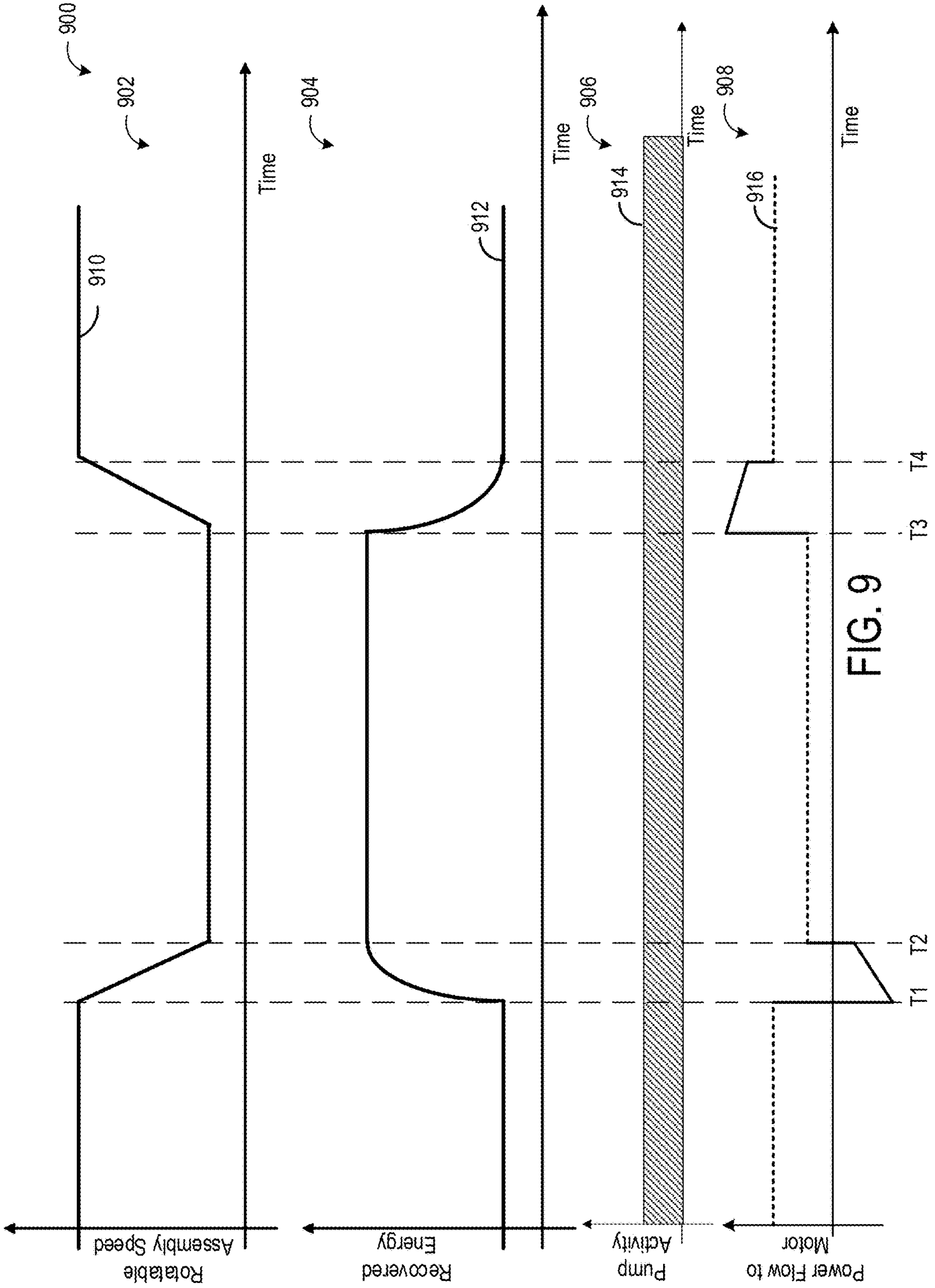
FIG. 9 is a time domain plot of features of a CT system operating under a first energy recovery strategy with power supplied from a main power supply.
Figure 10:
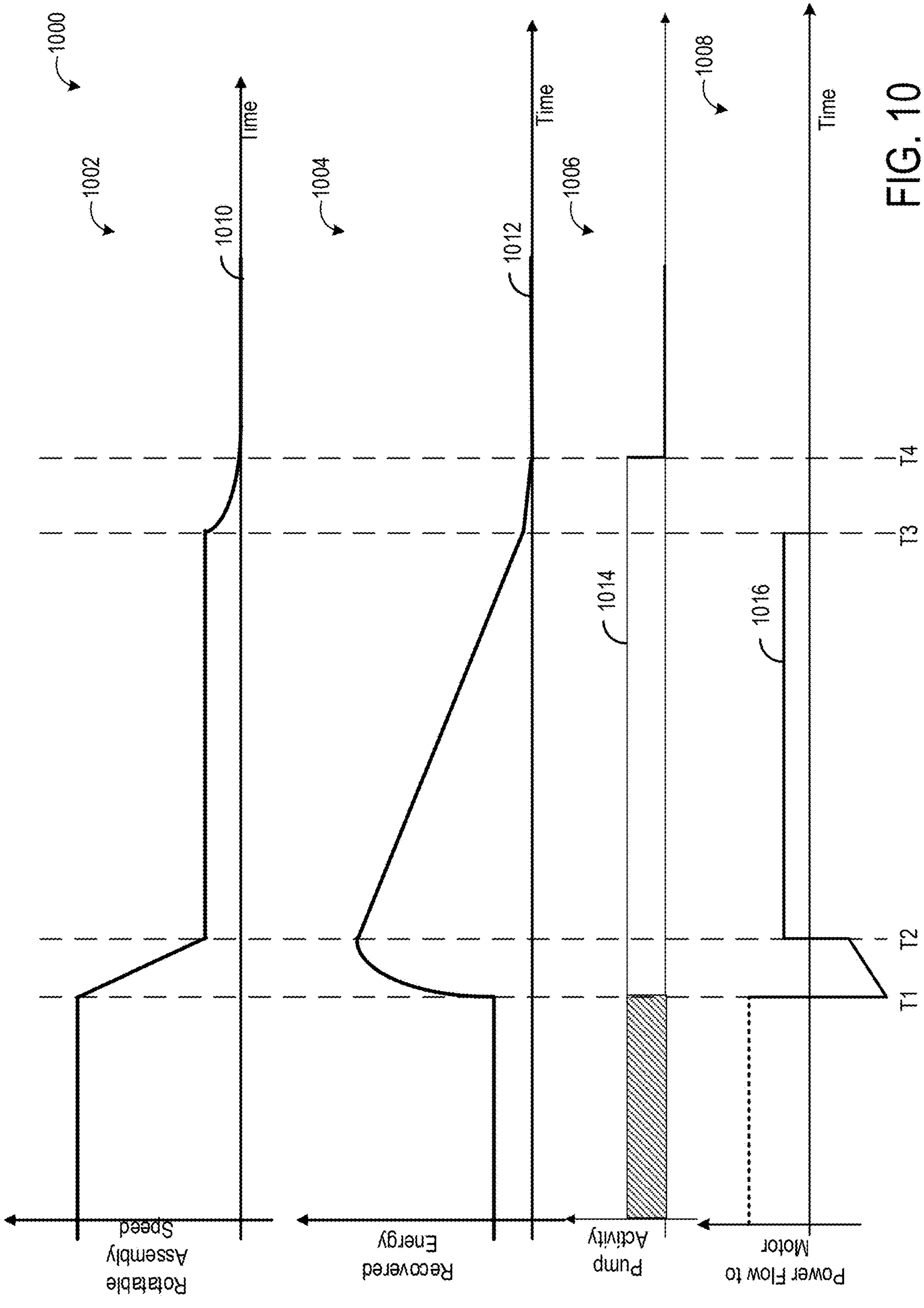
FIG. 10 is a time domain plot of features of the CT system operating under the first energy recovery strategy when a power outage of the main power supply occurs during an exposure.
Figure 11:
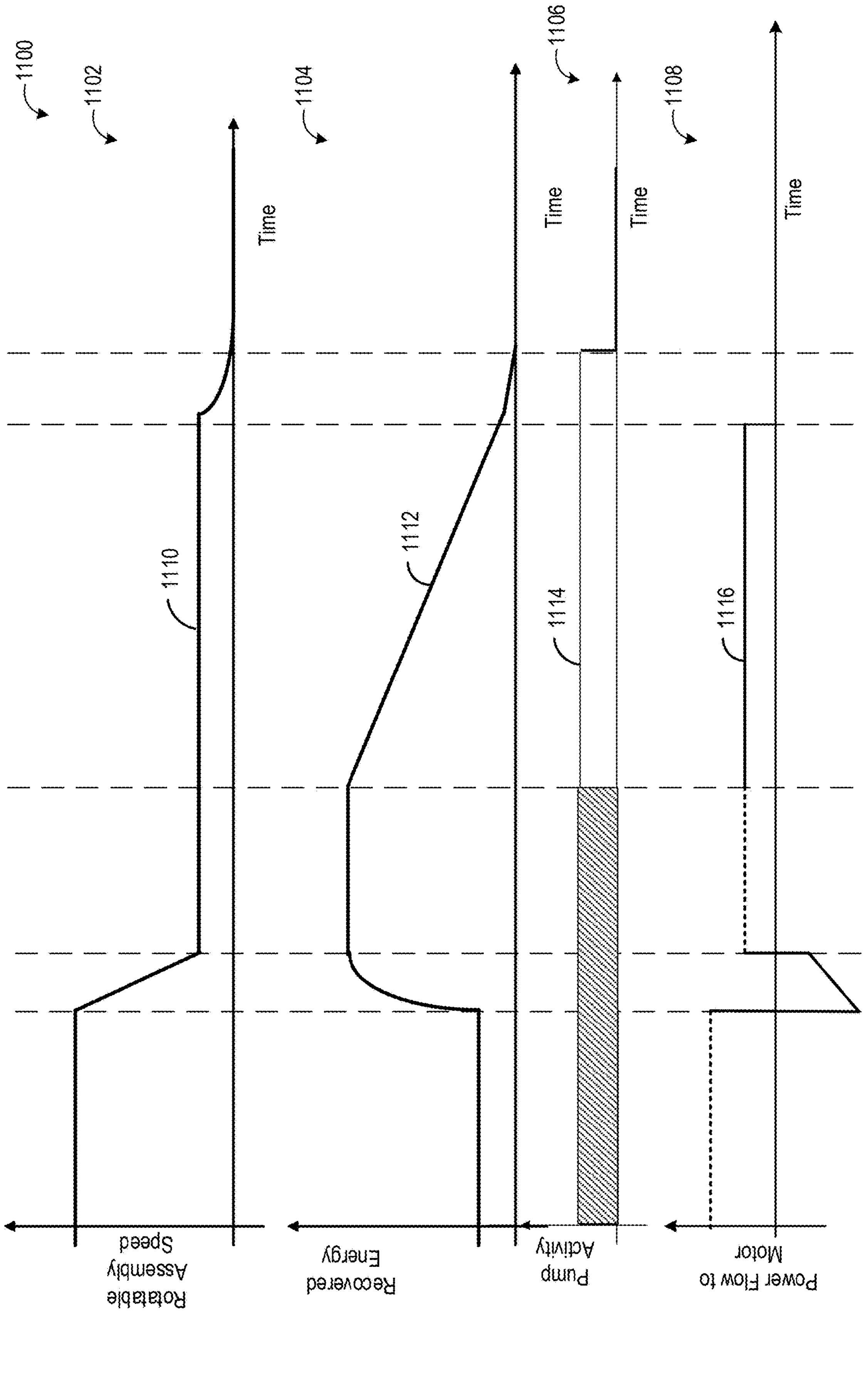
FIG. 11 is a time domain plot of features of the CT system operating under the first energy recovery strategy when a power outage of the main power supply occurs after an exposure.
Figure 12A:
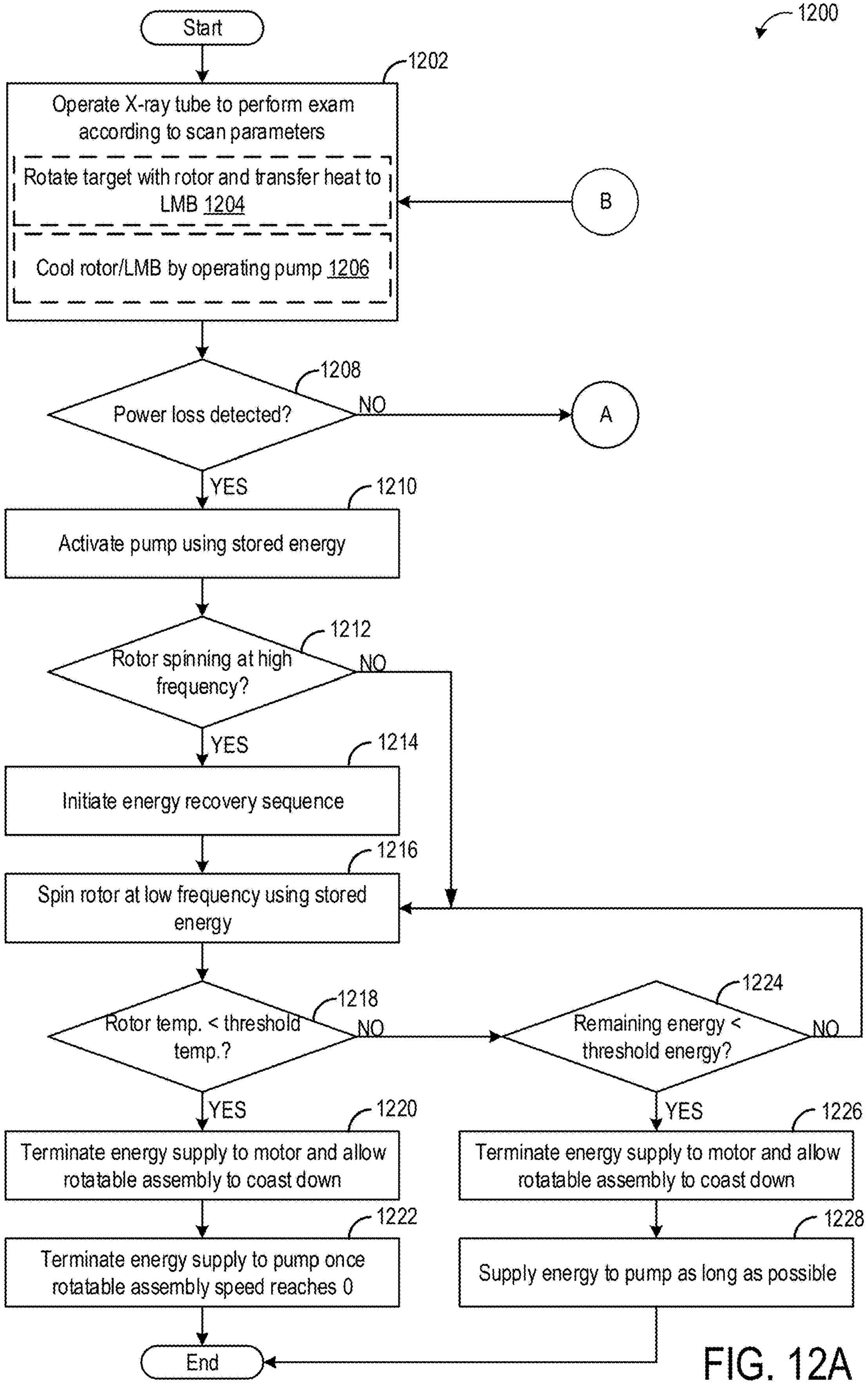
FIGS. 12A and 12B are a flowchart illustrating a method for a first energy recovery strategy.
Figure 12B:
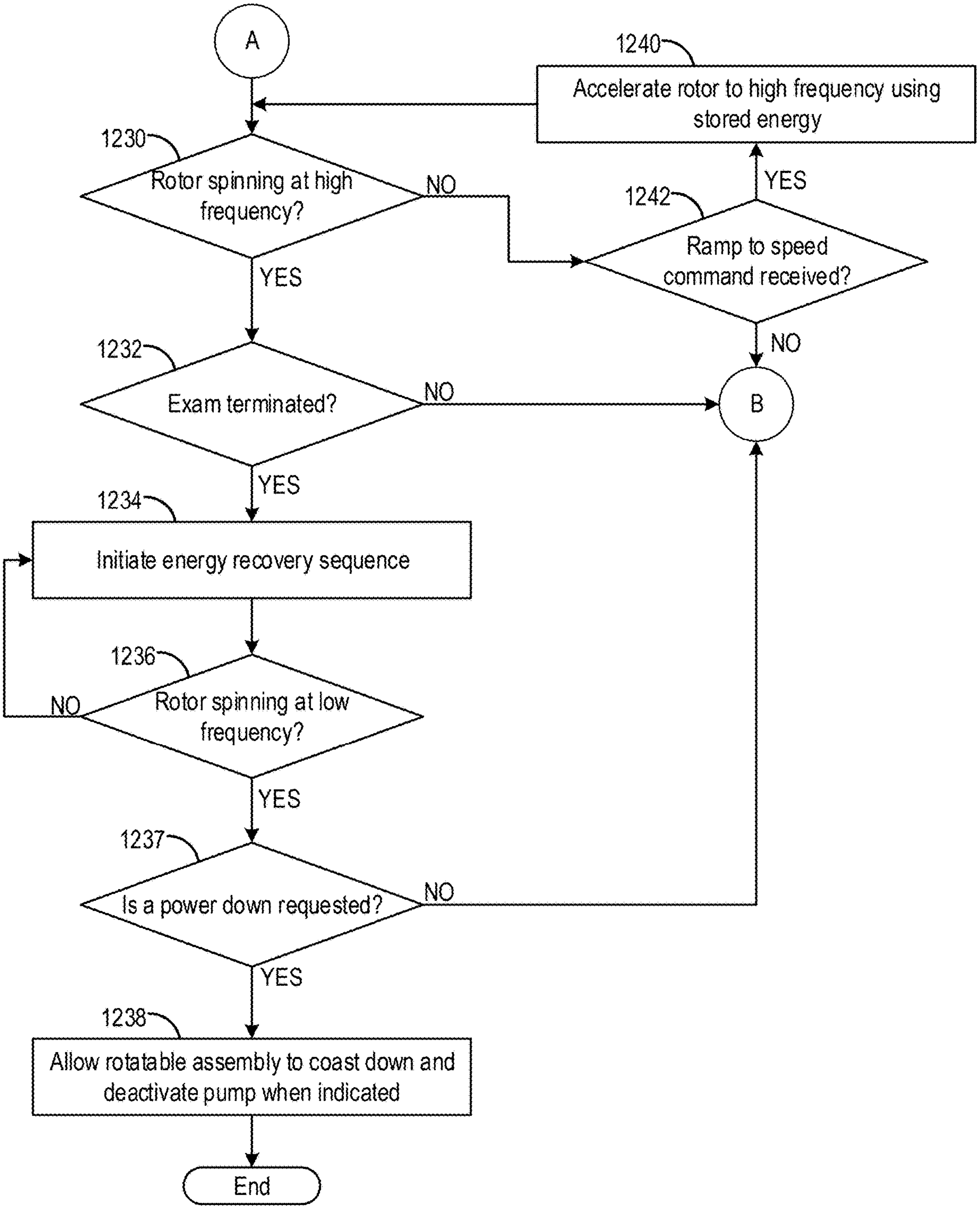
Figure 13:
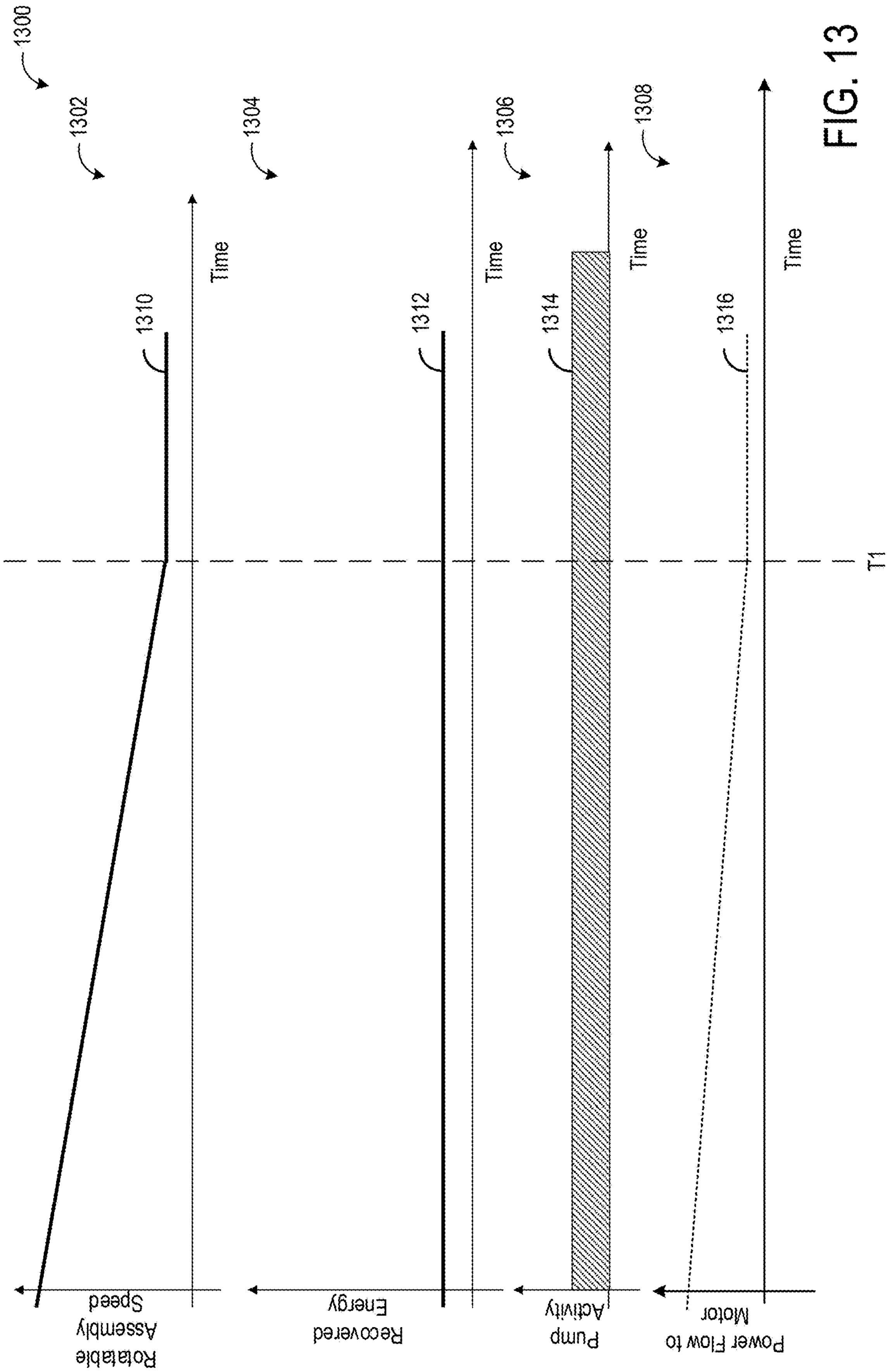
FIG. 13 is a time domain plot of features of a CT system operating under a second energy recovery strategy with power supplied from a main power supply.
Figure 14:
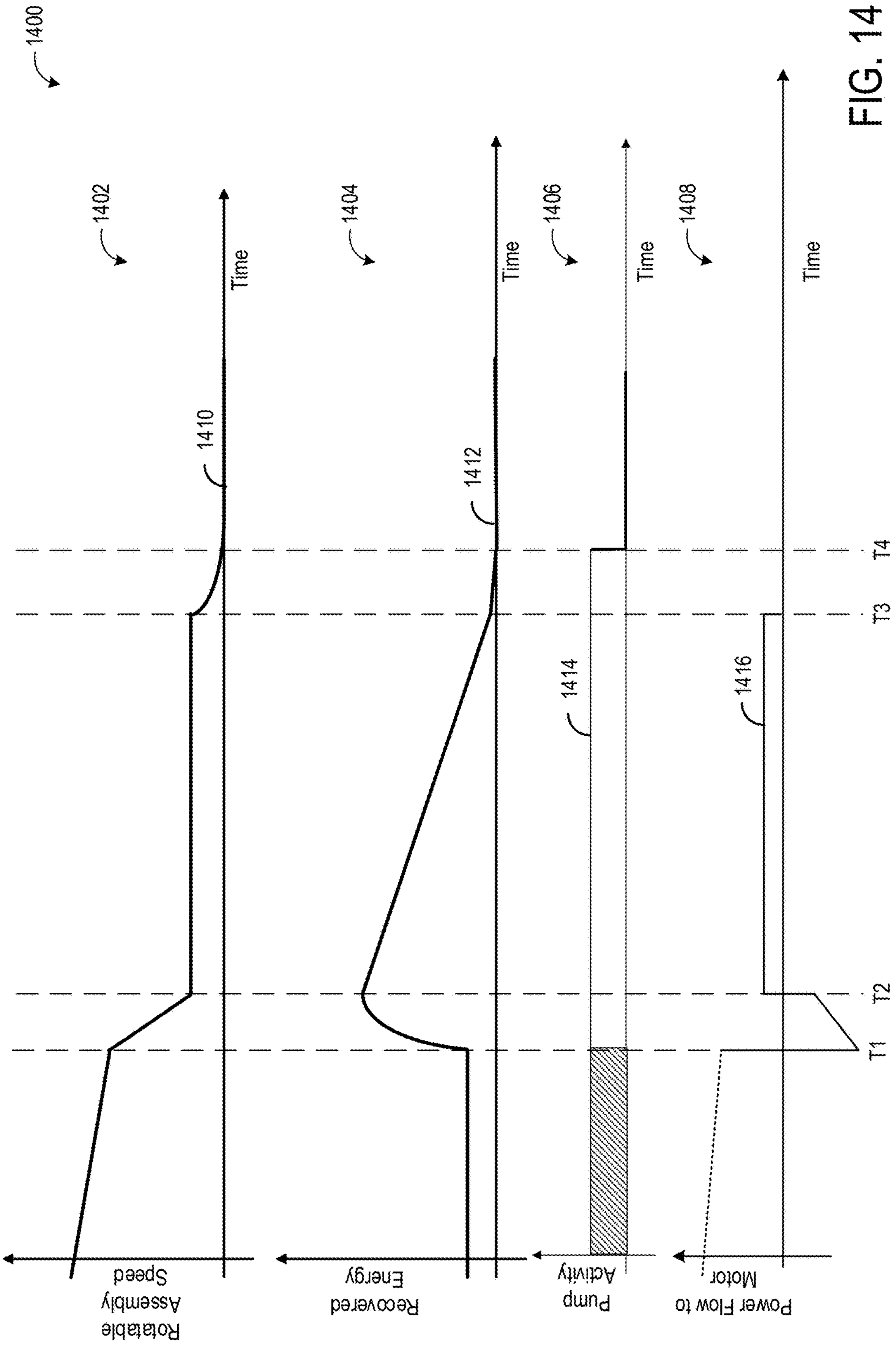
FIG. 14 is a time domain plot of features of the CT system operating under the second energy recovery strategy when a power outage of the main power supply occurs.
Figure 15A:
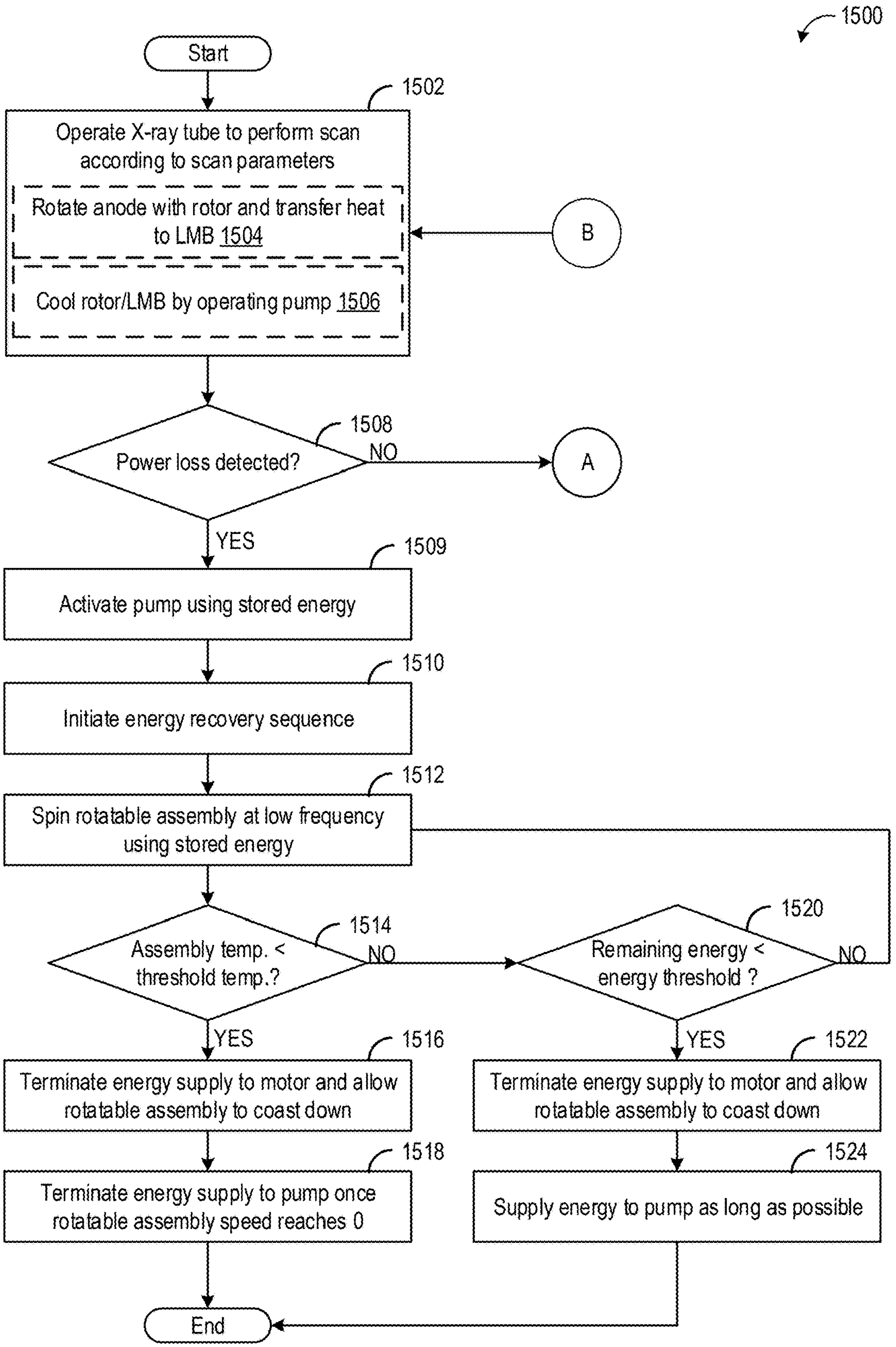
FIGS. 15A and 15B are a flowchart illustrating method for a second energy recovery strategy.
Figure 15B:
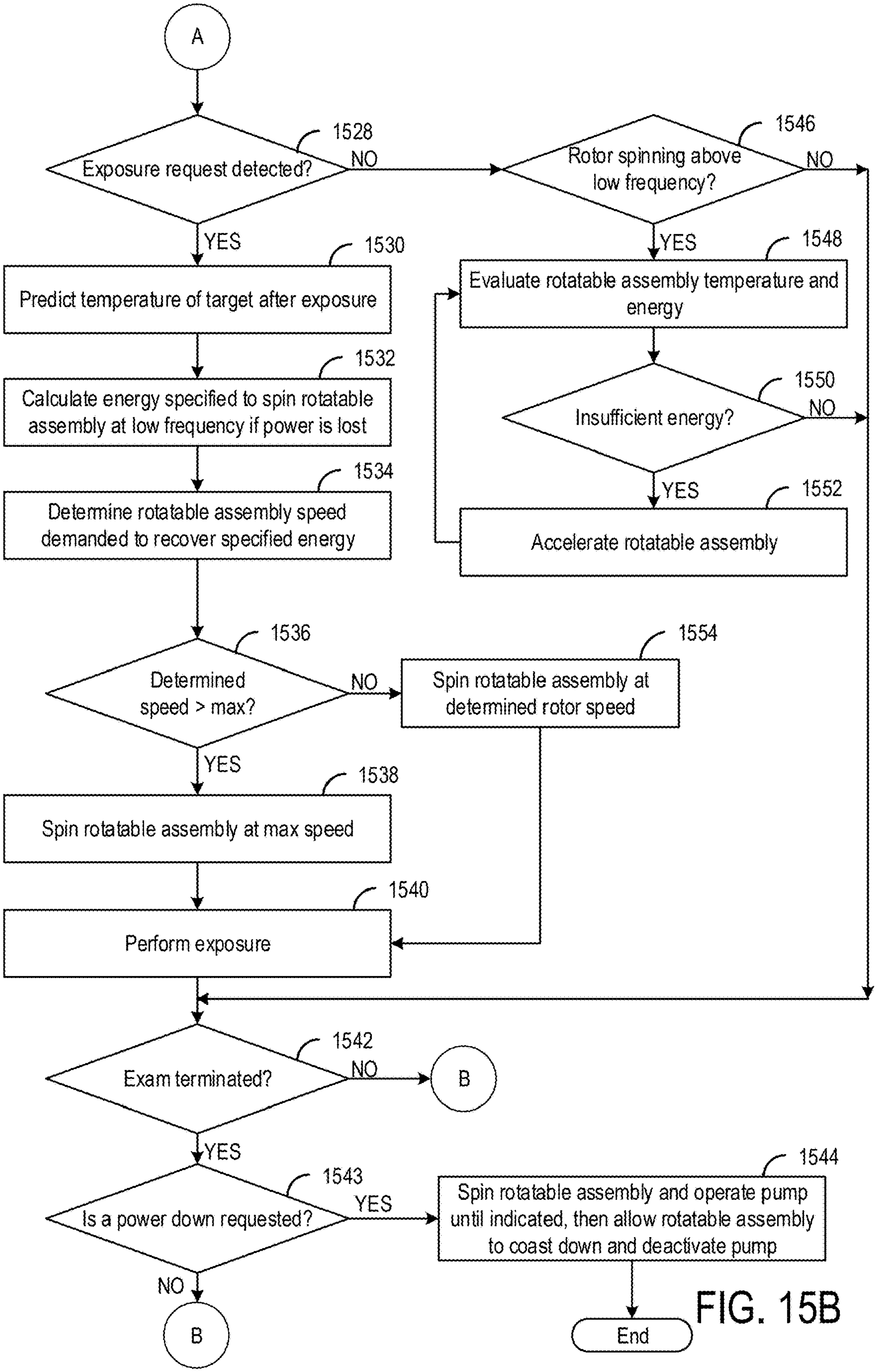

FIGS. 9-11 are plots of the energy recovery and distribution process over time during operation of the CT system according to the first energy recovery strategy, and an example method for which is illustrated in FIGS. 12A and 12B. A second energy recovery strategy includes recovering and storing energy from the rotatable assembly only if there is a power outage. FIGS. 13-14 are plots of the energy recovery and distribution process over time during operation of the CT system according to the second energy recovery strategy, and an example method for which is illustrated in FIGS. 15A and 15B.

FIG. 1 illustrates an exemplary computed tomography (CT) system 100 configured for CT imaging. Particularly, the CT system 100 is configured to image a subject 112 such as a patient, an inanimate object, one or more manufactured parts, and/or foreign objects such as dental implants, stents, and/or contrast agents present within the body. The CT system 100 includes a gantry 102, which in turn, may further include at least one X-ray source 104 configured to project a beam of X-ray radiation 106 (see FIG. 2) for use in imaging the subject 112 laying on a table 114. Specifically, the X-ray source 104 is configured to project the X-ray radiation beams 106 towards a detector array 108 positioned on the opposite side of the gantry 102. Although FIG. 1 depicts a single X-ray source 104, in certain embodiments, multiple X-ray sources and detectors may be employed to project a plurality of X-ray radiation beams for acquiring projection data at the same or different energy levels corresponding to the patient. In some embodiments, the X-ray source 104 may enable dual-energy spectral imaging by rapid peak kilovoltage (kVp) switching. In some embodiments, the X-ray detector employed is a photon-counting detector that is capable of differentiating X-ray photons of different energies. In other embodiments, the X-ray detector is an energy integrating detector in which the detected signal is proportional to the total energy deposited by all photons without specific information about each individual photon or its energy. In some embodiments, two sets of X-ray sources and detectors are used to generate dual-energy projections, with one set at low-kVp and the other at high-kVp.

In certain embodiments, the CT system 100 further includes an image processor unit 110 configured to reconstruct images of a target volume of the subject 112 using an iterative or analytic image reconstruction method. For example, the image processor unit 110 may use an analytic image reconstruction approach such as filtered back projection (FBP) to reconstruct images of a target volume of the patient. As another example, the image processor unit 110 may use an iterative image reconstruction approach such as advanced statistical iterative reconstruction (ASIR), conjugate gradient (CG), maximum likelihood expectation maximization (MLEM), model-based iterative reconstruction (MBIR), and so on to reconstruct images of a target volume of the subject 112. In some examples the image processor unit 110 may use an analytic image reconstruction approach such as FBP in addition to an iterative image reconstruction approach. In some embodiments, the image processor unit 110 may use a direct image reconstruction approach, such as using deep-learning trained neural networks.

In some CT imaging system configurations, an X-ray source projects a cone-shaped X-ray radiation beam which is defined with respect to an X-Y-Z Cartesian coordinate system and generally referred to as an "imaging volume." The X-ray radiation beam passes through an object being imaged, such as the patient or subject. The X-ray radiation beam, after being attenuated by the object, impinges upon an array of detector elements. The intensity of the attenuated X-ray radiation beam received at the detector array is dependent upon the attenuation of an X-ray radiation beam by the object. Each detector element of the array produces a separate electrical signal that is a measurement of the X-ray beam attenuation at the detector location. The attenuation measurements from all the detector elements are acquired separately to produce a transmission profile.

In some CT systems, the X-ray source and the detector array are rotated with a gantry within the imaging volume and around the object to be imaged such that an angle at which the X-ray beam intersects the object constantly changes. A group of X-ray radiation attenuation measurements, e.g., projection data, from the detector array at one gantry angle is referred to as a "view." A "scan" of the object includes a set of views made at different gantry angles, or view angles, during one revolution of the X-ray source and detector. It is contemplated that the benefits of the methods described herein accrue to medical imaging modalities other than CT, so as used herein the term "view" is not limited to the use as described above with respect to projection data from one gantry angle. The term "view" is used to mean one data acquisition whenever there are multiple data acquisitions from different angles, whether from a CT, a positron emission tomography (PET), a single-photon emission CT (SPECT) acquisition, and/or any other modality including modalities yet to be developed as well as combinations thereof in fused or hybrid embodiments.

The projection data is processed to reconstruct an image that corresponds to a two-dimensional slice taken through the object or, in some examples where the projection data includes multiple rotations or scans or two-dimensional (2D) arrays of detectors, a three-dimensional (3D) rendering of the object. One method for reconstructing an image from a set of projection data is referred to in the art as the filtered back projection technique. Transmission and emission tomography reconstruction techniques also include statistical iterative methods, such as maximum likelihood expectation maximization (MLEM) and ordered-subsets expectation-reconstruction techniques, as well as iterative reconstruction techniques. This process may convert the attenuation measurements from a scan into values called "CT numbers" or "Hounsfield units" (HU), which are used to control the brightness of a corresponding pixel on a display device.

To reduce the total scan time, a "helical" scan may be performed. To perform a "helical" scan, the patient is moved while the data for the prescribed number of slices are acquired. The position of the source with respect to the patient in such a system traces a helix. The helix mapped out by the source yields projection data from which images in each prescribed slice may be reconstructed.

As used herein, the phrase "reconstructing an image" is not intended to exclude embodiments of the present invention in which data representing an image are generated but a viewable image is not. Therefore, as used herein, the term "image" broadly refers to both viewable images and data representing a viewable image. However, many embodiments generate (or are configured to generate) at least one viewable image.

FIG. 2 illustrates an exemplary imaging system 200 similar to the CT system 100 of FIG. 1. In accordance with aspects of the present disclosure, the imaging system 200 is configured for imaging a subject 204 (e.g., the subject 112 of FIG. 1). In some embodiments, the imaging system 200 includes the detector array 108 (see FIG. 1). The detector array 108 further includes a plurality of detector elements 202 that together sense the X-ray radiation beam 106 (see FIG. 2) that passes through the subject 204 (such as a patient) to acquire corresponding projection data. In some embodiments, the detector array 108 may be fabricated in a multi-slice configuration including the plurality of rows of cells or detector elements 202, where one or more additional rows of the detector elements 202 are arranged in a parallel configuration for acquiring the projection data. The detector elements 202 may also be referred to as pixels or detector pixels.

In certain embodiments, the imaging system 200 is configured to traverse different angular positions around the subject 204 for acquiring desired projection data. Accordingly, the gantry 102 and the components mounted thereon may be configured to rotate about a center of rotation 206 for acquiring the projection data, for example, at different energy levels. Alternatively, in embodiments where the projection angle relative to the subject 204 varies as a function of time, the mounted components may be configured to move along a general curve rather than along a segment of a circle.

As the X-ray source 104 and the detector array 108 rotate, the detector array 108 collects data of the attenuated X-ray beams. The data collected by the detector array 108 undergoes pre-processing and calibration to condition the data to represent the line integrals of the attenuation coefficients of the scanned subject 204. The processed data are commonly called projections. In some examples, the individual detectors or detector elements 202 of the detector array 108 may include photon-counting detectors which register the interactions of individual photons into one or more energy bins.

The acquired sets of projection data may be used for basis material decomposition (BMD). During BMD, the measured projections are converted to a set of material-density projections. The material-density projections may be reconstructed to form a set of material-density maps or images of each respective basis material, such as bone, soft tissue, and/or contrast agent maps. The density maps or images may be, in turn, associated to form a 3D volumetric image of the basis material, for example, bone, soft tissue, and/or contrast agent, in the imaged volume.

Once reconstructed, the basis material image produced by the imaging system 200 reveals internal features of the subject 204, expressed in the densities of two basis materials. The density image may be displayed to show these features. In traditional approaches to diagnosis of medical conditions, such as disease states, and more generally of medical events, a radiologist or physician would consider a hard copy or display of the density image to discern characteristic features of interest. Such features might include lesions, sizes and shapes of particular anatomies or organs, and other features that would be discernable in the image based upon the skill and knowledge of the individual practitioner.

In one embodiment, the imaging system 200 includes a control mechanism 208 to control movement of the components such as rotation of the gantry 102 and the operation of the X-ray source 104. In certain embodiments, the control mechanism 208 further includes an X-ray controller 210 configured to provide power and timing signals to the X-ray source 104. Additionally, the control mechanism 208 includes a gantry motor controller 212 configured to control a rotational speed and/or position of the gantry 102 based on imaging requirements.

In certain embodiments, the control mechanism 208 further includes a data acquisition system (DAS) 214 configured to sample analog data received from the detector elements 202 and convert the analog data to digital signals for subsequent processing. The DAS 214 may be further configured to selectively aggregate data from a subset of the detector elements 202 into so-called macro-detectors. The data sampled and digitized by the DAS 214 is transmitted to a computer or computing device 216 via a slip ring 213. In one example, the computing device 216 stores the data in a storage device or mass storage 218. The storage device 218, for example, may be any type of non-transitory memory and may include a hard disk drive, a floppy disk drive, a compact disk-read/write (CD-R/W) drive, a Digital Versatile Disc (DVD) drive, a flash drive, and/or a solid-state storage drive.

Additionally, the computing device 216 provides commands and parameters to one or more of the DAS 214, the X-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a keyboard (not shown) or a touchscreen to allow the operator to specify the commands and/or scanning parameters.

Although FIG. 2 illustrates one operator console 220, more than one operator console may be coupled to the imaging system 200, for example, for inputting or outputting system parameters, requesting examinations, plotting data, and/or viewing images. Further, in certain embodiments, the imaging system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks, wireless telephone networks, wireless local area networks, wired local area networks, wireless wide area networks, wired wide area networks, etc.

In one embodiment, for example, the imaging system 200 either includes, or is coupled to, a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which in turn, may control a table 114 which may be a motorized table. Specifically, the table motor controller 226 may move the table 114 for appropriately positioning the subject 204 in the gantry 102 for acquiring projection data corresponding to the target volume of the subject 204.

As previously noted, the DAS 214 samples and digitizes the projection data acquired by the detector elements 202. Subsequently, an image reconstructor 230 uses the sampled and digitized X-ray data to perform high-speed reconstruction. Although FIG. 2 illustrates the image reconstructor 230 as a separate entity, in certain embodiments, the image reconstructor 230 may form part of the computing device 216. Alternatively, the image reconstructor 230 may be absent from the imaging system 200 and instead the computing device 216 may perform one or more functions of the image reconstructor 230. Moreover, the image reconstructor 230 may be located locally or remotely, and may be operatively connected to the imaging system 200 using a wired or wireless network. Particularly, one exemplary embodiment may use computing resources in a "cloud" network cluster for the image reconstructor 230.

In one embodiment, the image reconstructor 230 stores the images reconstructed in the storage device 218. Alternatively, the image reconstructor 230 may transmit the reconstructed images to the computing device 216 to generate useful patient information for diagnosis and evaluation. In certain embodiments, the computing device 216 may transmit the reconstructed images and/or the patient information to a display or display device 232 communicatively coupled to the computing device 216 and/or the image reconstructor 230. In some embodiments, the reconstructed images may be transmitted from the computing device 216 or the image reconstructor 230 to the storage device 218 for short-term or long-term storage.

Information may be transmitted between the components residing in the gantry 102 and external devices (such as the computing device 216 and/or image reconstructor 230) via the slip ring 213, which facilitates electronic communication across the rotating gantry. In some examples, the gantry and internal components (e.g., the control mechanism 208, X-ray source 104, the detector array 108) may be collectively defined as a CT scanner, and as such the computing device 216 and image reconstructor 230 may reside off the scanner.

Figure 3:
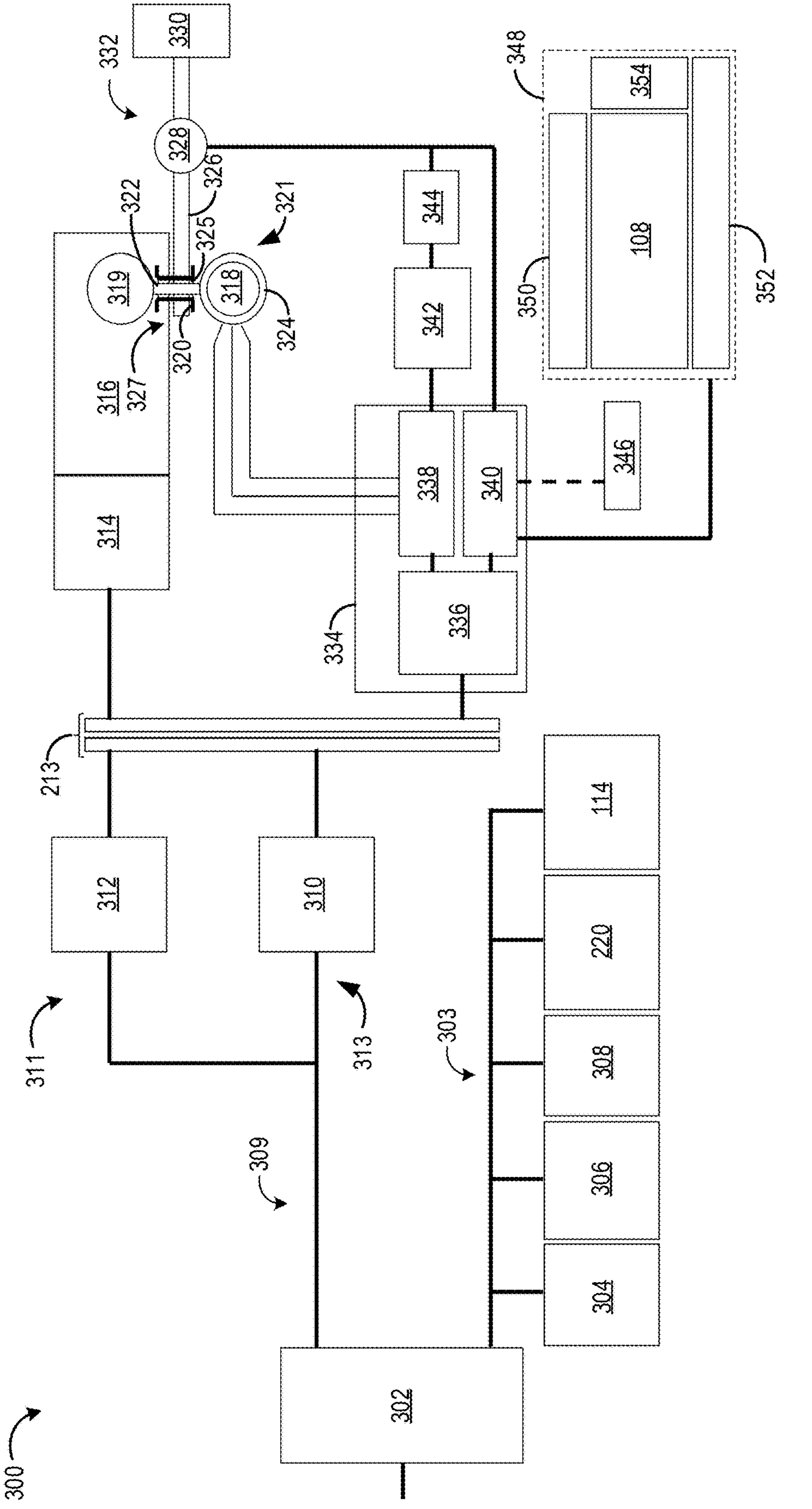
FIG. 3 shows a schematic diagram of an example CT imaging system with an energy storage and recovery system coupled to a motor in a first example arrangement.

The CT system described above with respect to FIGS. 1 and 2 may be one example of a system that integrates the energy recovery, storage, and distribution system described below. FIG. 3 is a schematic of a CT system 300 including an energy recovery, storage, and distribution system. The CT system 300 may include a power distribution unit (PDU) 302. The PDU 302 may be coupled to an external power source, e.g., a power grid via an outlet. The PDU 302 may receive power from the external power source and allocate the power to a variety of different electrical components. The PDU 302 may further have a protective function and may be able to interrupt the flow of power through the PDU 302 to prevent power surges from reaching other components of the CT system 300. The PDU may be coupled through a first power distribution path 303 to a plurality of electronic devices positioned off the gantry and thus coupled to the gantry via the slip ring 213, such as reconstruction hardware 304 (which is a non-limiting example of image reconstructor 230), blowers and fans 306, a stationary power board (SPB) SPB 308, the operator console 220, and the table 114.

The PDU 302 may further be coupled to a second power distribution path 309 that couples the PDU 302 with elements of the gantry. The second power distribution path may include parallel branches, with a first branch 311 carrying power to an X-ray tube 316 and a second branch 313 carrying power to auxiliary electronics on the rotating side of the slip ring 213. The first branch 311 may couple the PDU 302 to an X-ray inverter 312. The X-ray inverter 312 is configured to a direct current supplied by the PDU 302 to an alternating current. The X-ray inverter 312 may produce an alternating current of a specific frequency that may depend on the specifications of other components of the CT system. The X-ray inverter 312 may be coupled to an X-ray generator 314 across the slip ring 213. The X-ray generator 314 is configured to convert the AC signal provided by the X-ray inverter to a direct current and generate a high voltage that may be applied across the X-ray tube 316. The X-ray tube 316 may include a cathode that emits electrons based upon the current applied to a cathode filament. The cathode may be positioned a distance apart from a target 319, which may be a rotatable, disk-shaped anode in some examples. A significant difference in potential between the cathode and the anode may be produced when the X-ray generator is powered on and producing the voltage difference. Electrons released by the cathode may accelerate towards the target 319 due to the large potential difference. X-rays may be released when the electrodes strike the target 319. The target 319 may be rotated by a motor 321 including a rotor 318 and stator 324 to distribute heat generated from electrons striking the target 319. As explained previously, the motor 321 may be a motor/generator that is configured to operate as a motor during some conditions and operate as a generator during other conditions.

The stator 324 is a non-rotating component of the motor 321 that may receive electrical power to rotate the rotor 318, which may be a rotatable component of the motor 321. The motor 321/X-ray tube may thereby include a rotatable assembly 327 that includes the rotor 318, a sleeve 325 of a liquid metal bearing (LMB) 320, and the target 319. The components of the rotatable assembly 327 may be rotatably coupled and are rotated when the rotor 318 receives torque from the stator 324. The LMB 320 may include a shaft 322 that is stationary while the rotatable assembly 327 rotates. The LMB 320 may include a rotatable sleeve 325 that surrounds the shaft 322. The space between the sleeve 325 and the shaft 322 may be filled with liquid metal, such as gallium alloy. In some examples, the shaft 322 and/or sleeve 325 may include grooves to allow the liquid metal to circulate to preferred regions within the space between the sleeve and the shaft. The rotation of the rotatable assembly and circulation of the liquid metal may act to dissipate heat.

The coolant circuit 332 may include a cooling channel 326 that fluidly couples a tube pump 328 and a heat exchanger 330 to the motor 321. The cooling channel 326 may include a portion that is thermally coupled to one or more components of the rotatable assembly 327 such as the rotor 318, the LMB 320, the sleeve 325, and/or the shaft 322. The cooling channel 326 may be a tube connecting portions of the coolant circuit 332 or the cooling channel 326 may be channel integrated into components of the X-ray tube 316, stator 324, tube pump 328, and/or heat exchanger 330. The tube pump 328 may pump coolant from the heat exchanger 330 to the motor 321 (e.g., around the LMB 320) where the coolant accumulates heat from the rotatable assembly 327. The coolant may be returned to the heat exchanger 330 (e.g., via a return path not shown in FIG. 3) where heat accumulated in the coolant may be released to the environment.

The second branch of the second power distribution path 309 may couple the PDU 302 to an auxiliary inverter 310. The auxiliary inverter 310 may convert the direct current supplied by the PDU 302 to an alternating current. The auxiliary inverter 310 may be electrically coupled to a rotating auxiliary power unit 334 via the slip ring 213. The rotating auxiliary power unit 334 may be capable of directing the flow of power to elements of the CT system 300 that rotate within the gantry. The rotating auxiliary power unit 334 may include a rectifying and filtering board 336 which is a circuit board configured to function with AC power signals. The frequency range of the rectifying and filtering board 336 may be between 300 MHz and 3 GHz in some examples. The rectifying and filtering board 336 may include electrical components capable of controlling, distributing, and filtering power received by the rotating auxiliary power unit 334 through the slip ring 213 to be usable for a plurality of electrical devices coupled to the rotating auxiliary power unit 334.

The rectifying and filtering board 336 may be coupled to a rotating control board (RCB) 338 and a 48V fuse and control board 340 within the rotating auxiliary power unit 334. The RCB 338 may be coupled to the stator 324 of the motor 321 via a plurality of cables, which may in some examples include three separate cables surrounded by a conductive shield. The RCB 338 may include a controller which may include memory storing instructions for the operation of the motor 321 and the distribution of power to devices coupled to the RCB 338 as well as one or more processors configured to execute the instructions stored in memory. The RCB 338 may be coupled to an energy storage circuit 342. The energy storage circuit 342 may include one or more batteries, capacitors, etc., configured to store energy. In some examples, the energy storage circuit 342 may include a controller which may include memory storing instructions executable by one or more processors for the recovering and storing rotational energy from the rotatable assembly 327 as electrical energy. Rotational energy may be recovered and converted to electrical energy as the rotatable assembly 327 slows down and may be transferred to the RCB 338 within the rotating auxiliary power unit 334. The recovered electrical energy may be transferred from the RCB 338 to the energy storage circuit 342 where the recovered energy may be stored in the one or more batteries, capacitors, etc. The energy storage circuit 342 may issue commands to the RCB 338 relating to the initiation and termination of an energy recovery process, which may be relayed to the stator 324 by the RCB 338.

The energy storage circuit 342 may be coupled to a pump circuit 344. The pump circuit 344 may include a controller with a memory storing instructions related to operating the tube pump 328 and one or more processors configured to execute the instructions. The pump circuit 344 may be coupled to the tube pump 328 and may control the operation of the tube pump 328 if there is a power outage. If a power outage occurs, stored energy from the energy storage circuit 342 may be relayed to the pump circuit 344 and may be delivered to the tube pump 328 according to instructions stored within the pump circuit 344. In the event of a power outage, the energy storage circuit 342 may provide power to the motor 321 by supplying to power to the RCB 338, which may be distributed to the motor 321 according to instructions stored in the RCB 338.

As mentioned above, rectifying and filtering board 336 may be coupled to the 48V fuse and control board 340. The 48V fuse and control board 340 may include a controller which may include memory storing instructions for the distribution of energy to a plurality of devices as well as one or more processors configured to execute the instructions stored in memory. The 48V fuse and control board 340 may include a plurality of fuses that may prevent power surges from reaching the devices coupled to the 48V fuse and control board 340. The 48V fuse and control board 340 may power a plurality of devices by providing 48V of voltage to the plurality of devices including the tube pump 328, a detector system 348, and a plurality of other 48V loads 346.

The detector system 348 may be configured to detect X-rays that have been emitted by the X-ray tube 316 and passed through the subject 112. The detector system 348 may include a detector power management unit 352, the detector array 108, one or more fans 350, and a heat exchanger 354. The detector power management unit 352 may receive power from the 48V fuse and control board 340 and distribute the power to the other components of the detector system 348. As described above with respect to FIGS. 1 and 2, the detector array 108 may detect X-rays attenuated by an object, such as the subject 112. The detector array 108 may be cooled by the one or more fans 350 and a heat exchanger 354. The one or more fans 350 and heat exchanger 354 may maintain the temperature of the detector array 108 to prevent overheating.

Figure 4:
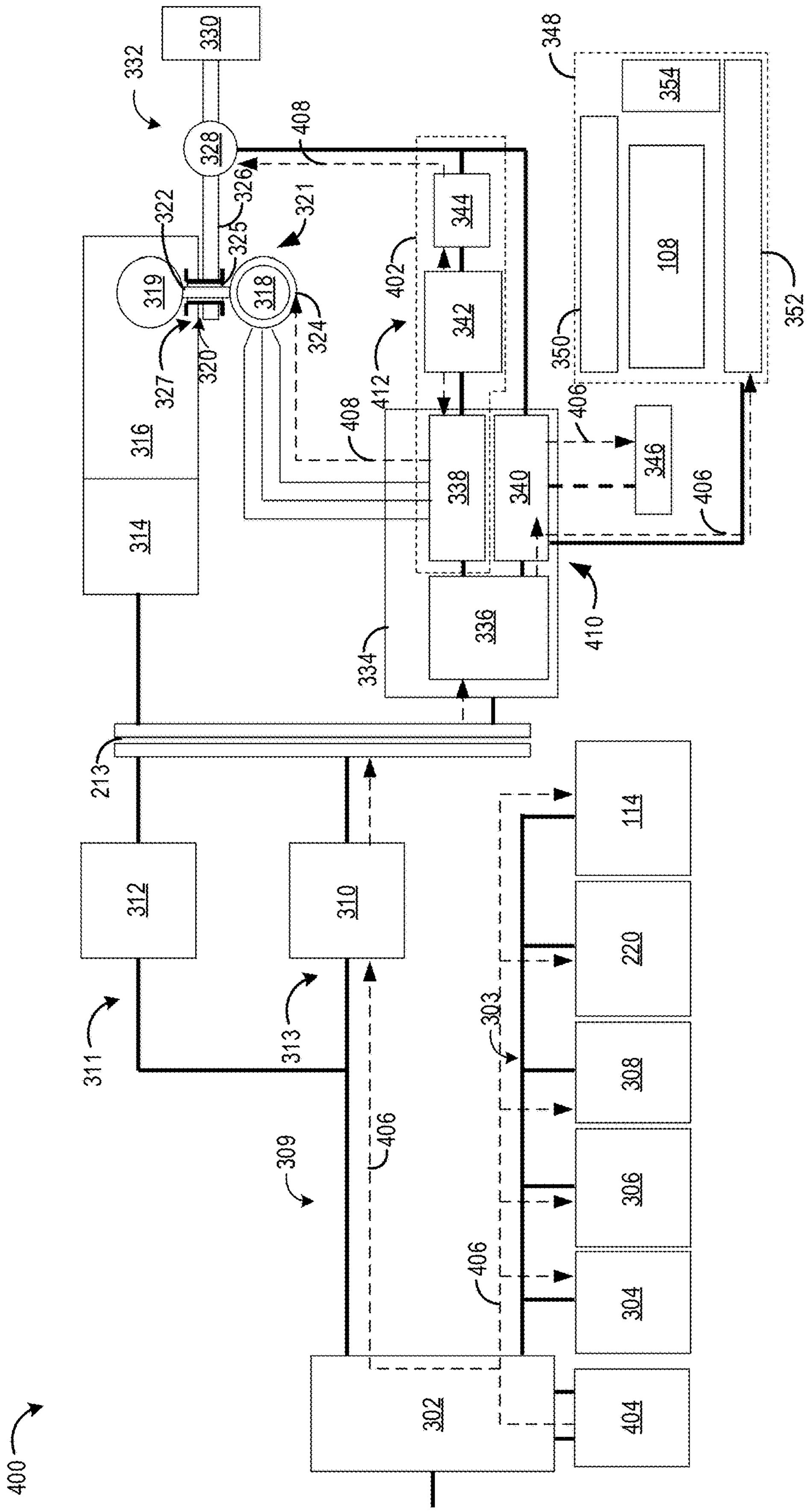
FIG. 4 shows a schematic diagram of an example CT imaging system with an uninterruptible power supply and an energy storage and recovery system coupled to a motor in the first example arrangement.

FIG. 4 is a schematic of a CT system 400 similar to the schematic of the CT system 300 shown in FIG. 3. Components included in both CT system 300 and CT system 400 are given like numbers and the description of these components provided above with respect to CT system 300 likewise applies to CT system 400. CT system 400 includes an uninterruptible power supply (UPS) 404. The UPS 404 may provide backup power to the CT system 400 during a power loss/outage (e.g., when power from a main power supply, such as the electrical grid, is no longer supplied to the PDU 302). During an outage, power may be directed from the UPS 404 along a first path 406. The first path 406 may be indicated by a series of dashed arrows originating at the UPS 404. Following the first path 406, power may be directed from the UPS 404 to the PDU 302. The PDU 302 may distribute that power through the first power distribution path 303 to a plurality of off-gantry devices such as reconstruction hardware 304, blowers and fans 306, the SPB 308, the operator desktop console 220, and the table 114. The PDU 302 may also distribute power through the second power distribution path 309 to the auxiliary inverter 310, across the slip ring 213, and into the rectifying and filtering board 336. The first path 406 may continue from the rectifying and filtering board 336 to the 48V fuse and control board 340. The 48V fuse and control board 340 may distribute power to the detector system 348 and other 48V loads 346. Via the first path 406, the detector system 348 and the other 48V loads 346 may be powered by the UPS 404. Providing power to the detector system 348 and other 48V loads 346 via the UPS during a power outage may allow data from the scan to be collected despite the outage, which may prevent disruptions to CT procedure scheduling by reducing the need to repeat a scan that occurs during a power outage.

Other devices that may be supplied power during an outage may be powered by energy stored in the energy storage circuit 342 via a second path 408. Stored energy in the energy storage circuit 342 may be used to power the tube pump 328 and the motor 321. Via the second path 408, energy may be distributed from the energy storage circuit 342 and through the pump circuit 344 before being distributed to the tube pump 328. As an additional portion of the second path 408, energy may be distributed from the energy storage circuit 342 to the RCB 338 and power may be distributed from the RCB 338 to the motor 321. Power flow to the tube pump 328 when power is supplied to the CT system 400 by the main power supply may occur via a first pump system 410 that includes the 48V fuse and control board 340, the rectifying and filtering board 336, and the electrical connection between the 48V fuse and control board 340 and the tube pump 328. Power flow to the tube pump 328 when the main power supply is lost (e.g., due to a power outage) may occur via a second pump system 412 that includes the energy storage circuit 342, the pump circuit 344, and the electrical connection between the pump circuit 344 and the tube pump 328. It is to be appreciated that the power paths (e.g., the first path 406 and the second path 408) are shown schematically and are not intended to be separate from the electrical connections between the devices shown in FIG. 4. For example, the power path from the RCB 338 to the motor 321 occurs via the cables coupling the RCB 338 to the motor 321 and not via a separate connection.

Therefore, the UPS 404 and energy storage circuit 342 may provide power to different portions of the CT system 400. The energy storage circuit 342 may be configured to provide power to the motor 321 and the tube pump 328 while the UPS 404 may be configured to power the detector system 348 and the plurality of off-gantry devices.

As appreciated in FIG. 4, the RCB 338, the energy storage circuit 342, and the pump circuit 344 may define a self-contained hot landing protection system 402. In the example shown in FIGS. 3 and 4, the self-contained hot landing protection system 402 includes a component (e.g., the RCB 338) located on/as part of the rotating auxiliary power unit 334 and components located off the rotating auxiliary power unit 334 (e.g., the energy storage circuit 342 and the pump circuit 344). However, the self-contained hot landing protection system 402 may be positioned at different locations within the CT system without departing from the scope of this disclosure, as explained in more detail below.

In some examples (not shown), the self-contained hot landing protection system 402 may be included in the rotating auxiliary power unit 334. Within the rotating auxiliary power unit 334, the self-contained hot landing protection system 402 may be coupled to the rectifying and filtering board 336 and the 48V fuse and control board 340. The self-contained hot landing protection system 402 may be electrically coupled to the motor 321 by a plurality of cables that extend from the RCB 338 to the motor 321. Thus, in these examples, the energy storage circuit 342 and the pump circuit 344 may be included within/as part of the rotating auxiliary power unit 334.

Figure 5:
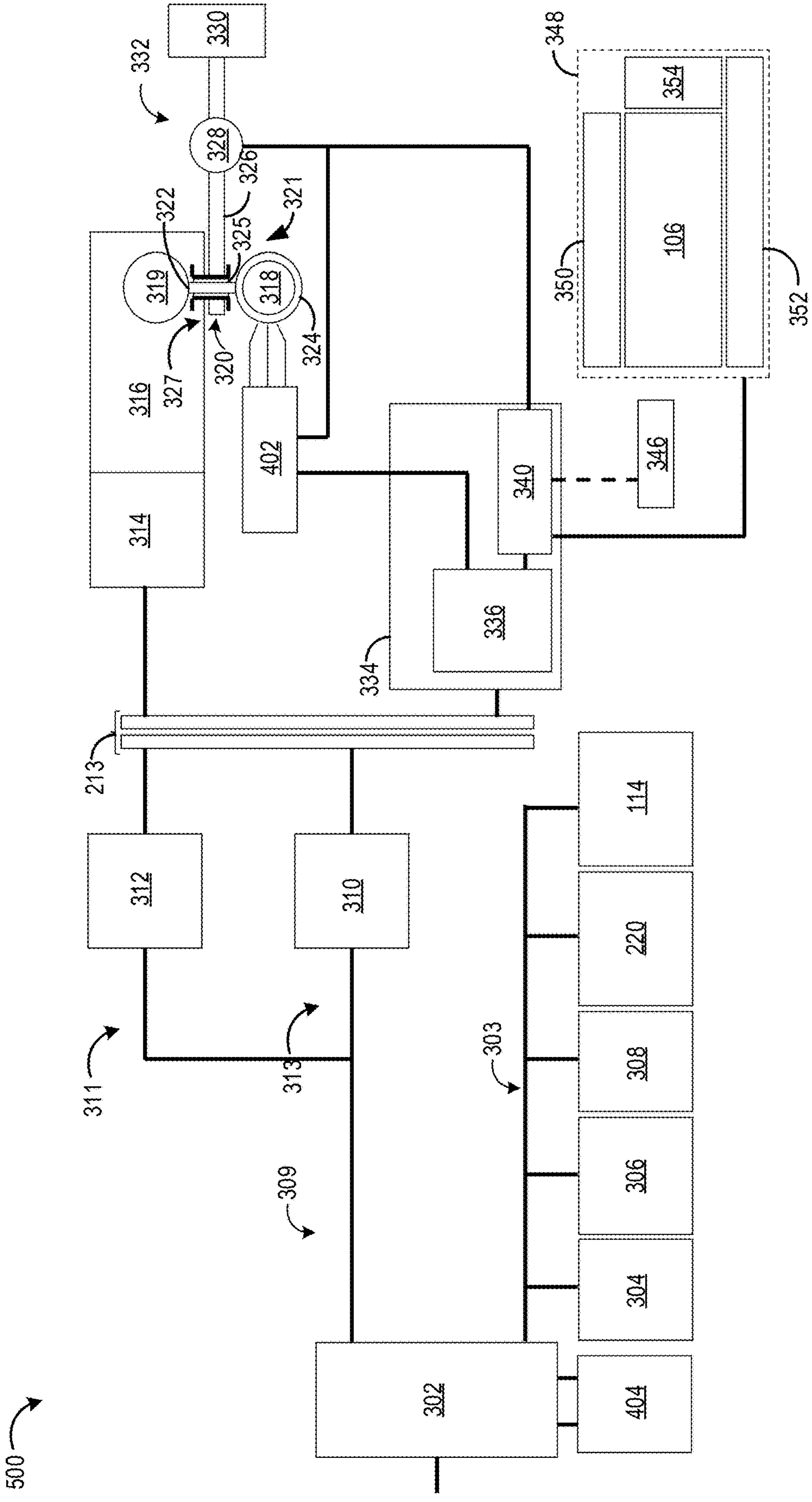
FIG. 5 shows a schematic diagram of an example CT imaging system with an uninterruptible power supply and an energy storage and recovery system coupled to a motor in a second example arrangement.

FIG. 5 shows a schematic of an example CT system 500 with the self-contained hot landing protection system 402 located at an alternative position within the CT system 500 compared to CT system 400. In FIG. 5, the self-contained hot landing protection system 402 is not included in the rotating auxiliary power unit 334 but is coupled to the rotating auxiliary power unit 334. Additionally, the self-contained hot landing protection system 402 may be coupled to the motor 321 by three cables, and may be coupled to the tube pump 328 and the rectifying and filtering board 336 within the rotating auxiliary power unit 334 by respective cables or other coupling method. By moving the components of the self-contained hot landing protection system 402 off the rotating auxiliary power unit 334, the self-contained hot landing protection system 402 may be positioned closer the motor 321 than when components of the self-contained hot landing protection system 402 (and specifically the RCB 338) are positioned on the rotating auxiliary power unit 334. Positioning the self-contained hot landing protection system 402 closer to the motor 321 may reduce the amount of cable used to couple the motor 321 to the RCB 338 and thus reduce the amount of electromagnetic shielding demanded and thereby lowering manufacturing cost and complexity. In one example, the number of cables used to couple the motor 321 to the RCB 338 may be reduced from three cables to two cables.

A plurality of coupling arrangements between the energy storage circuit 342, the RCB 338, and the pump circuit 344 within the self-contained hot landing protection system 402 are possible. FIG. 6 is a schematic diagram of a motor circuit 600 including the self-contained hot landing protection system 402. The self-contained hot landing protection system 402 may include and be coupled to components of CT system 300, CT system 400, or CT system 500. FIG. 6 includes a main power source 602 (e.g., a main power supply) that provides power to the self-contained hot landing protection system 402. The main power source 602 may be the rectifying and filtering board 336, which may receive power from the auxiliary inverter 310, which in turn receives power from the PDU 302 (and ultimately the power grid), as described with respect to FIG. 3. A diode 606 may be coupled to one outlet of the main power source 602 to ensure current only flows in one direction out of the main power source 602 and into the self-contained hot landing protection system 402.

The self-contained hot landing protection system 402 may include the energy storage circuit 342, the RCB 338, the pump circuit 344, and a capacitor bank 604. In the motor circuit 600, the energy storage circuit 342 may be connected in a series and parallel configuration with the main power source 602. In some examples of the motor circuit 600, the storage circuit 342 may include electrical isolation. The series and parallel configuration may allow the energy storage circuit 342 to control the distribution of energy through the self-contained hot landing protection system 402. The energy storage circuit 342 may include one or more energy storage technologies such as batteries, capacitors, or superconductors. The energy storage circuit 342 may be arranged in parallel with the capacitor bank 604 and the RCB 338. The capacitor bank 604 may be capable of storing energy in the self-contained hot landing protection system 402 as well as reducing fluctuations in the voltage supplied to the system by the main power source 602. The capacitor bank 604 may operate as a filtering element during normal operations to limit the amount of electromagnetic interference (EMI) and electromagnetic compatibility (EMC). The capacitor bank 604 may also function as a complementary energy storage element. In some examples, the capacitor bank 604 may be arranged to have a different time constant to access stored energy than the energy storage circuit 342. The capacitor bank 604 may operate as a buffer to the different energy storage technologies within the energy storage circuit 342 as well as provide extra energy storage capacity. The RCB 338 may be coupled to the stator 324 of the motor 321 by a plurality of cables 608. The RCB 338 may supply power from the main power source 602 or the energy storage circuit 342 to the stator 324 of the motor 321 to rotate the rotatable assembly 327. Additionally, energy recovered from the motor 321 may be conducted through the plurality of cables 608 and the RCB 338 may distribute the recovered energy to the energy storage circuit 342. The energy storage circuit 342 may be arranged in series with the pump circuit 344, and the energy storage circuit 342 may direct power from the main power source 602 to the pump circuit 344 or the energy storage circuit 342 may supply stored energy to the pump circuit 344. The pump circuit 344 may control the operation of the tube pump 328 and direct power to the tube pump 328.

An alternative circuit arrangement for the energy storage circuit 342, the RCB 338 and the pump circuit 344 is shown in FIG. 7. FIG. 7 is a schematic diagram of a motor circuit 700 including the self-contained hot landing protection system 402. The motor circuit 700 may be comprised of a plurality of components described with respect to FIGS. 3, 4, and 5 and 6. In the example shown in FIG. 7, the energy storage circuit 342 may be arranged in series with the main power source 602 and may also be arranged in series with the parallel configuration of the capacitor bank 604 and the RCB 338. The energy storage circuit 342 may be arranged in series with the pump circuit 344 as described above with respect to FIG. 6. The motor circuit 700 may be easier to control than the motor circuit 600, but may result in a larger voltage applied to the capacitor bank 604 and the RCB 338. A higher voltage applied to the capacitor bank 604 and the RCB 338 may increase the design demands for the capacitor bank 604 and the RCB 338.

Another alternative circuit arrangement for the energy storage circuit 342, the RCB 338 and the pump circuit 344 is shown in FIG. 8. FIG. 8 is a schematic diagram of a motor circuit 800 including the self-contained hot landing protection system 402. The motor circuit 800 may be comprised of a plurality of components described in more detail with respect to FIGS. 3, 4, 5 and 6. In the example shown in FIG. 8, the energy storage circuit 342 may be arranged in parallel with the capacitor bank 604 and the RCB 338. The pump circuit 344 may be coupled in series to the energy storage circuit 342. In the motor circuit 800, the energy storage circuit 342 may include a buck/boost element to couple the energy storage circuit 342 at low voltage to the voltage required to power the motor.

Thus, the systems described above provide for an energy recovery, storage, and distribution system including a self-contained hot landing protection system configured to recover energy from a motor of an X-ray tube and apply the stored energy to the motor and/or a coolant pump to ensure continued rotatable assembly rotation and cooling in the event of a power outage of a main power supply, such as an electrical grid or generator. The energy recovery, storage, and distribution system may be controlled to operate according to various control strategies. A first control strategy may include capturing energy from the rotatable assembly after every exposure and storing the energy to be reused for the next time the speed of the rotatable assembly is increased or if power loss of the main power supply occurs. In case of a power outage, the stored energy may be used to keep the rotatable assembly spinning at low frequency. Energy may be recovered during ramp-down, which is a process during which the rotatable assembly speed decreases over a period of time after an X-ray exposure has occurred and power from the main power supply is not applied to the motor. During the ramp-down of the rotatable assembly, energy is both recovered as well as lost to heat. The faster the rotatable assembly speed decreases, the greater the proportion of energy recovered compared to energy lost to heat is. The kinetic energy recovered as the rotatable assembly slows may be converted to electrical energy and stored. The stored energy may be used during the next ramp up of the rotatable assembly. Ramp up is the process during which the rotatable assembly increases in speed before an exposure begins. By storing the energy during ramp down and re-using the energy during ramp up, the additional power demand for acceleration of the rotatable assembly is greatly decreased leading to additional energy saving and reduced electrical stress and electromagnetic interference generation on the power chain subsystems. The first control strategy is explained below with respect to a plurality of time domain plots illustrated in FIGS. 9-11.

FIG. 9 is a time domain plot 900 showing the rotatable assembly speed, recovered energy, pump operation, and power flow into a motor in a CT system such as CT system 300, CT system 400, or CT system 500 operating when power is supplied to the imaging system from the main power supply, which may be the electrical grid or a generator. A first subplot 902 includes a first curve 910 which represents the rotatable assembly speed over time (e.g., the speed of rotatable assembly 327), a second subplot 904 includes a second curve 912 which represents the amount of energy recovered from the rotatable assembly 327 by the energy recovery, storage, and distribution system, stored in the energy storage circuit (e.g., in energy storage circuit 342), and depleted from the energy storage circuit, a third subplot 906 includes a third curve 914 which represents the activity of a tube pump over time (e.g., tube pump 328), and a fourth subplot 908 includes a fourth curve 916 that represents the amount of power being directed into the motor (e.g., motor 321) from the main power supply (shown by the dotted line portions of the fourth curve 916) and the energy storage circuit (shown by the solid line portions of the fourth curve 916). Each of first subplot 902, second subplot 904, and fourth subplot 908 includes respective values (e.g., of rotatable assembly speed, energy, and power flow) increasing along the y-axis and third subplot 906 shows pump operation as binary (on/off). Each of the subplots are time-aligned and time points of interest are marked with dashed lines.

Before T1, an X-ray exposure is occurring, during which the rotatable assembly is rotated at high speed (as shown by first curve 910), the pump is operational and is controlled according to a cooling strategy demanded by the first pump system 410 (as appreciated by third curve 914, which indicates via the hatched lines that the pump is being controlled by the first pump system 410), and power flow to the motor is from the main power supply, such as a connection to an electrical grid, as appreciated by the dashed lines of fourth curve 916. The exposure ends at T1. Between T1 and T2 is a ramp down period during which the rotatable assembly speed decreases, shown by the negatively sloped section of the first curve 910. Energy is recovered from the slowing rotatable assembly, as shown by the positive slope of the second curve 912 between T1 and T2. In some examples, a slight lag (e.g., of 1-10 seconds) may occur between initiation of the ramp down of the rotatable assembly and when energy starts to be recovered from the rotatable assembly and stored in the energy storage circuit. No power is supplied to the motor during the ramp down process, and the energy recovered is supplied to the energy storage circuit. The amount of energy supplied to the storage circuit is displayed by the negative portion of the fourth curve 916 between T1 and T2.

Between T2 and T3 is a rest period where an X-ray exposure is not occurring. During this period, the rotatable assembly speed is kept at a constant, low speed which may be 50 Hz or a similar frequency. The low rotation speed is shown on the first subplot 902 by the horizontal section of the first curve 910. The amount of stored recovered energy remains constant between T2 and T3, shown by the horizontal section of the second curve 912 between T2 and T3 (e.g., energy recovery ceases following T2). There is a low level of constant power flow into the motor from the main power supply between T2 and T3 to maintain the low rotatable assembly speed, shown on the fourth subplot 908 by the horizontal section of the fourth curve 916 between T2 and T3.

Between T3 and T4 the rotatable assembly may ramp up to prepare for the next exposure. The ramp up process may include accelerating the rotatable assembly to reach a commanded/threshold speed for the next exposure. In some examples, the commanded/threshold speed may be 180 Hz for a high speed exposure and 145 Hz for a low speed exposure. The accelerating rotatable assembly can be seen in the first subplot 902 by the positive slope of the first curve 910 between T3 and T4. Stored energy in the energy storage circuit may be used to facilitate the ramp up, which decreases the amount of stored recovered energy. The decrease in stored recovered energy can be seen in the second subplot 904 in the negative slope of the second curve 912 between T3 and T4. The energy supplied to the motor from the energy storage circuit increases at T3 to provide enough energy to accelerate the rotatable assembly between T3 and T4. An exposure may occur after T4, during which the rotatable assembly rotates at high speeds, shown as the horizontal section of the first curve 910 after T4. The pump operates for the duration of the process as demanded in order to maintain the rotatable assembly, LMB, etc., below a threshold temperature, which includes time before T1 and after T4 as well as the duration between T1 and T4. While third subplot 906 depicts a constant operation of the pump represented by a constant value of the third curve 914, it is to be appreciated that the speed of the pump may be adjusted and/or the pump may be operated in an intermittent manner in order to meeting cooling demands.

FIG. 10 is a time domain plot 1000 showing the rotatable assembly speed, recovered and stored energy, pump operation, and power flow into the motor in the CT system such as CT system 300, CT system 400, or CT system 500, similar to FIG. 9 but operating when power is supplied to the imaging system from the main power supply, which may be PDU 302, until a power outage is detected during an exposure and energy stored within the self-contained hot landing protection system is used to spin the rotatable assembly and operate the pump. A first subplot 1002 includes a first curve 1010 which represents the rotatable assembly speed over time, a second subplot 1004 includes a second curve 1012 which represents the amount of energy stored in the energy storage circuit, a third subplot 1006 includes a third curve 1014 which represents the activity of the tube pump over time, and a fourth subplot 1008 includes a fourth curve 1016 that represents the amount of power being directed into the motor from the main power supply (shown by the dotted line portions of the fourth curve 1016) and the energy storage circuit (shown by the solid line portions of the fourth curve 1016). Each of first subplot 1002, second subplot 1004, and fourth subplot 1008 includes respective values (e.g., of rotatable assembly speed, energy, and power flow) increasing along the y-axis and the third subplot 1006 shows pump operation as binary (on/off). Each of the subplots are time-aligned and time points of interest are marked with dashed lines.

Before T1, an X-ray exposure is occurring, and thus the rotatable assembly is rotated at high speed, the pump is operational and is controlled according to a cooling strategy demanded by the first pump system 410 (as appreciated by third curve 1014, which indicates via the hatched lines that the pump is being controlled by the first pump system 410), and power to flow to the motor is from the main power supply, such as a connection to an electrical grid. At T1, a power loss occurs such that the power being supplied from the main power supply is interrupted. After T1, the pump is forced to operate using energy stored within the energy storage circuit 342, which is shown by the horizontal portion of the third curve 1014 that does not include a fill pattern (e.g., the white/blank section). After the power outage, the ramp down process occurs between T1 and T2 according to the same process described with respect to FIG. 9. Thus, during the time period between T1 and T2, the rotatable assembly speed decreases, shown by the negatively sloped section of the first curve 1010. Energy is recovered from the slowing rotatable assembly, as shown by the positive slope of the second curve 1012 between T1 and T2. In some examples, a slight lag (e.g., of 1-10 seconds) may occur between initiation of the ramp down of the rotatable assembly and when energy starts to be recovered from the rotatable assembly and stored in the energy storage circuit. No power is supplied to the motor during the ramp down process, and all the energy that is recovered while the rotatable assembly is spinning is supplied to the energy storage circuit. The amount of energy supplied to the storage circuit is displayed by the negative portion of the fourth curve 1016 between T1 and T2.

After T2, the rotatable assembly reaches a threshold speed (e.g., the low speed described above) and the recovered energy is used to maintain the rotatable assembly at the low speed, such as 50 Hz. Between T2 and T3, the stored energy decreases linearly, as shown in the second subplot 1004 by the exponential decrease of the second curve 1012 between T2 and T3. The stored energy is used to maintain pump operation, shown by the third curve 1014 between T1 and T4, and to rotate the rotatable assembly at the low speed, shown as the horizontal section of the first curve 1010 between T2 and T3. The power flow into the motor between T2 and T3 is constant, shown by a horizontal section of the fourth curve 1016 between T2 and T3. The power flows from the energy storage circuit into the motor, as appreciated by the solid line portion of fourth curve 1016

At T3, the stored energy supply in the energy storage circuit reaches a lower threshold, which may indicate that insufficient energy is left in the energy storage circuit to power both the motor and the tube pump. As such, the power supplied to the motor from the energy storage circuit is terminated and the power supplied to the motor decreases to 0 at T3. After T3, the rotatable assembly coasts to a stop because no stored energy is being used to power the rotation of the rotatable assembly. The rotatable assembly coasting to a stop is shown in the first subplot 1002 by the nonlinear decay of the rotatable assembly speed between T3 and T4. Power is recovered from the rotatable assembly as the rotatable assembly ramps down, but at a lower rate compared to the energy recovery rate between T2 and T3 because the rotatable assembly speed is decreasing. At T4, the rotatable assembly speed is equal to 0, indicating the rotatable assembly has stopped. The pump is deactivated after the rotatable assembly has stopped at T4, shown by the pump activity represented by the third curve 1014 dropping to 0 after T4. The pump may be deactivated when the rotatable assembly speed reaches 0, as shown, or the pump may be deactivated when the stored recovered energy is depleted or when the rotatable assembly temperature reaches a threshold temperature. The pump is kept operational until the rotatable assembly speed drops to 0 to provide effective cooling throughout the process and to prevent a hot landing by ensuring the LMB temperature and rotatable assembly temperature are reduced after the power outage. Keeping the rotatable assembly rotating at low speeds for as long as possible also helps prevent hot landings by keeping the rotatable assembly and LMB moving, which prevents mechanical contact and potential fusing between the sleeve within the rotational assembly and the shaft.

FIG. 11 is a time domain plot 1100 showing the rotatable assembly speed, recovered and stored energy, pump operation, and power flow into the motor for the CT system, similar to FIGS. 9 and 10, but when operating with power supplied from the main power supply until a power outage is detected between X-ray exposures. A first subplot 1102 includes a first curve 1110 which represents the rotatable assembly speed over time, a second subplot 1104 includes a second curve 1112 which represents the amount of energy stored in the energy storage circuit, a third subplot 1106 includes a third curve 1114 which represents the activity of the tube pump over time, and a fourth subplot 1108 includes a fourth curve 1116 that represents the amount of power being directed into the motor from the main power supply (shown by the dotted line portions of the fourth curve 1116) and the energy storage circuit (shown by the solid line portions of the fourth curve 1116). Each of first subplot 1102, second subplot 1104, and fourth subplot 1108 includes respective values (e.g., of rotatable assembly speed, energy, and power flow) increasing along the y-axis and third subplot 1106 shows pump operation as binary (on/off). Each of the subplots are time-aligned and time points of interest are marked with dashed lines.

Before T1, an X-ray exposure is occurring, and thus the rotatable assembly is rotated at high speed, the pump is operational and is controlled according to a cooling strategy demanded by the first pump system 410 (as appreciated by third curve 1114, which indicates via the hatched lines that the pump is being controlled by the first pump system 410), and power flow to the motor is from the main power supply. The exposure ends at T1 and the power supply to the motor is terminated. Between T1 and T2 is a ramp down period during which the rotatable assembly speed decreases, shown by the negatively sloped section of the first curve 1110. Energy is recovered from the slowing rotatable assembly, as shown by the positive slope of the second curve 1112 between T1 and T2. In some examples, a slight lag (e.g., of 1-10 seconds) may occur between initiation of the ramp down of the rotatable assembly and when energy starts to be recovered from the rotatable assembly and stored in the energy storage circuit. No power is supplied to the motor during the ramp down process, and the energy recovered from the rotatable assembly is supplied to the energy storage circuit. The amount of energy supplied to the storage circuit is displayed by the negative portion of the fourth curve 1116 between T1 and T2. The pump is powered by the first pump system 410 until a power loss is detected.

At T2, the rotatable assembly reaches a threshold speed (e.g., the low speed described above). Between T2 and T3 is a rest period where an X-ray exposure is not occurring. During this period, the rotor speed is kept at a constant, low speed which may be 50 Hz or lower, with power supplied from the main power supply, in anticipation of a subsequent exposure and/or to cool the rotatable assembly. The low rotation speed is shown on the first subplot 1102 by the horizontal section of the first curve 1110. The amount of stored energy remains constant between T2 and T3, shown by the horizontal section of the second curve 1112 between T2 and T3. A low level of constant power flows into the motor from the main power supply between T2 and T3 to maintain the low rotatable assembly speed, shown on the fourth subplot 1108 by the horizontal section of the fourth curve 1116 between T2 and T3.

At T3, a power outage occurs and power from the main power supply is no longer available. Between T3 and T4, the stored energy in the energy storage circuit is used to provide power to the motor to keep the rotatable assembly speed at the threshold speed (e.g., the low speed). The use of stored energy to power the motor and the pump circuit is shown by the linear decrease in the second curve 1112 between T3 and T4. The constant power flow into the motor from the energy storage circuit is shown between T3 and T4 as a horizontal section of the fourth curve 1116. Additionally, at T3, the pump is forced to operate in the ON condition using the stored energy from the energy storage circuit, which is shown by the horizontal portion of the third curve 1114 that does not include a fill pattern (e.g., the white/blank section).

At T4, the stored energy in the energy storage circuit reaches a lower threshold, which may indicate that insufficient energy is left in the energy storage circuit to power both the motor and the tube pump. As such, the power supplied to the motor from the energy storage circuit is terminated and the power supplied to the motor decreases to 0 at T4. After T4, the rotatable assembly coasts to a stop because no stored energy is being used to spin the rotatable assembly. The rotatable assembly coasting to a stop is shown in the first subplot 1102 by the exponential decay of the rotatable assembly speed between T4 and T5.

At T5, the rotatable assembly speed is equal to 0, indicating the rotatable assembly has stopped. The pump is deactivated after the rotatable assembly has stopped at T5, shown by the pump activity represented by the third curve 1114 dropping to 0 at T5. The pump is kept active until the rotatable assembly speed drops to 0 to provide effective cooling throughout the process and to prevent a hot landing by ensuring the LMB temperature and rotatable assembly temperature are reduced after the power outage. Keeping the rotatable assembly rotating at low speeds for as long as possible also helps prevent hot landings by keeping the rotatable assembly and LMB moving, which prevents the mechanical contact and potential fusing between the sleeve within the rotational assembly and the shaft. Due to continued operation of the tube pump between T4 and T5, the amount of recovered energy stored in the energy storage circuit continues to decrease as the rotor coasts to a stop, but at a slower rate than the recovered energy is used between T3 and T4, since the energy in the energy storage circuit is only being used to power the tube pump between T4 and T5. The slower rate is shown on the second subplot 1104 by the shallower slope of the second curve 1112 between T4 and T5 relative to between T3 and T4.

Turning now to FIGS. 12A and 12B, they show a method 1200 for controlling the operation of an energy recovery, storage, and distribution system, such as the energy storage circuit 342, a cooling pump such as tube pump 328, and a motor such as motor 321, according to the first energy recovery strategy in order to recover energy from the motor after every exposure and expend stored energy during ramp up of the motor or during a power outage. Method 1200 may be carried out according to instructions stored in memory of one or more controllers or computing devices included as part of and/or operatively coupled to a CT imaging system, such as CT system 300, CT system 400, or CT system 500. At 1202, the method 1200 may include operating the X-ray tube to perform an exam in accordance with one or more scan parameters. The scan parameters may include the number of exposures to be performed during the exam, the length of each exposure, the voltage and/or current of the X-ray tube for each exposure, and/or other parameters. Operating the X-ray tube to perform the exam may include rotating the target of the X-ray tube with the motor and transferring resulting heat from an exposure to the LMB of the rotatable assembly, as indicated at 1204. The target may be rotated to distribute thermal energy from electrons striking the target during an exposure to a focal band comprised of a plurality of positions on the target as the target rotates rather than a single focal point. Further, heat may be generated as the rotatable assembly rotates due to friction and as a product of the motor operation that rotates the rotatable assembly. Operating the X-ray tube to perform the exam may further include operating the tube pump to cool the rotatable assembly and the LMB, as indicated at 1206. The tube pump may be a component of a coolant circuit and directs a coolant to flow through the coolant circuit to make thermal contact with the LMB and rotatable assembly to absorb excess heat from the LMB and rotatable assembly. The coolant may be circulated by the pump to a heat exchanger where the temperature of the coolant is reduced.

At 1208, the method 1200 may include identifying if a power loss has occurred. Identifying if a power loss has occurred may include identifying a loss of power from the main power supply, such as via monitoring a current through one or both of the inverters or other mechanism. The main power supply may stop supplying power in the event of a power outage or due to an operator turning off or unplugging the CT system, for example. Monitoring for the power loss may occur through the duration of the scan, as a power loss can be identified at any time within a scan. If a power loss is detected, the method 1200 proceeds to 1210, which is explained in more detail below, and if a power loss is not detected, the method proceeds to 1230, which is included in FIG. 12B. A power loss can occur at any point of the method 1200 and if a power loss is identified at any point in a scan, the method 1200 may include immediately proceeding to 1210 from the point in the method 1200 where the power loss was detected.

At 1230, the method may include determining if the rotatable assembly is spinning at a high frequency, such as above 50 Hz. One or more sensors may be integrated into the motor to measure the rate of rotation of the rotatable assembly. If the rotatable assembly is not spinning at high frequency, the method 1200 may include determining if the rotatable assembly is being commanded to ramp to a higher speed at 1242. The rotatable assembly may be commanded to speed up to prepare for a subsequent exposure, or to match the rotatable assembly speed to the scan parameters initiated at 1202. If a ramp to a higher speed command has not been received, the method 1200 may continue to operate the X-ray tube to perform the exam at 1202. If a ramp to a high frequency command has been received, then the method 1200 may continue at 1240, which includes accelerating the rotatable assembly to the higher frequency using stored energy. Mechanical energy from the decelerating rotatable assembly is stored as electrical energy after every exposure in an energy storage circuit (e.g., energy storage circuit 342), and the recovered energy may be used to supply power to the motor to ramp up the rotational frequency of the rotatable assembly to the commanded frequency. Once the commanded frequency has been reached, the method 1200 may continue at 1230.

If the rotatable assembly is rotating at high frequency at 1230, the method 1200 may include evaluating if the exam is terminated at 1232. The exam may be terminated based on the scan parameters indicating the exam is complete (e.g., the exam may be carried out according to a protocol and the exam may be terminated in response to the protocol being completed) or the exam may be manually terminated by an operator (e.g., the operator may enter input indicating the exam is complete). If the exam is not terminated at 1232, the method 1200 may continue to operate the X-ray tube to perform the exam in accordance with the scan parameters at 1202.

If the exam is terminated at 1232, the method 1200 may include initiating an energy recovery sequence at 1234. The energy recovery sequence may include terminating the power supply (e.g., from the main power supply) to the rotatable assembly to slow the rotatable assembly and converting the kinetic energy of the rotatable assembly into electrical energy by slowing the rotatable assembly and storing the electrical energy in the energy storage circuit for future use. The energy recovery sequence may include monitoring the rotational frequency of the rotatable assembly and at 1236, the method 1200 may include determining if the rotatable assembly is rotating at or below a low frequency threshold. The low frequency threshold may be a frequency at which a hot landing is unlikely to occur if the rotatable assembly is stopped, such as a frequency below 50 Hz. If the rotational frequency of the rotatable assembly has not reached the low frequency threshold at 1236, the method 1200 may include continuing the energy recovery sequence at 1234 until the frequency of the rotatable assembly reaches the low frequency threshold. If the rotatable assembly is spinning at or below the low frequency at 1236, the method 1200 may include, at 1237, determining if a request to power down the CT system has been received. If a request to power down the CT system has not been received at 1237, the CT system may remain operative and ready for a successive scan by the method 1200 proceeding to 1202. When the CT system is operative and an exam is not occurring, the rotatable assembly may be rotated at the low frequency (e.g., 50 Hz) until the next exam is initiated. If a request to power down the CT system has been received at 1237, the method 1200 may proceed to 1238. At 1238, the rotatable assembly is allowed to coast down to 0 speed. Allowing the rotatable assembly to coast down may include turning off power to the motor and allowing the rotatable assembly rotational frequency to decrease to zero. The pump may be deactivated when the temperature of the rotatable assembly and LMB has decreased past a certain threshold, or the pump may be deactivated a certain amount of time after the rotatable assembly has coasted down, or the pump may be deactivated based on an additional set of criteria. The method may end once the pump has been deactivated and the rotatable assembly has coasted down. It is to be appreciated that the rotatable assembly may be allowed to coast down only after the rotatable assembly has been rotated at the low frequency for a duration that allows cooling of the rotatable assembly and LMB, and once the duration has passed, the power supply to the motor may be terminated. Further, in some examples, prior to the rotatable assembly coasting down, a new exam may be initiated, in which case method 1200 may loop back to 1202 to again operate the X-ray tube to perform the next exam.

Returning to 1208 of FIG. 12A, if a power outage is detected at 1208, the method 1200 may include, at 1210, activating the pump (e.g., the tube pump 328) using the energy stored within the energy storage circuit such as energy storage circuit 342 of FIG. 3 as well as part of the energy in the capacitor bank 604 of FIGS. 6 and 7. The stored energy may have been harvested and stored when the rotatable assembly ramped down during a previous exposure. The pump pumps cooling fluid to cool the LMB and the rotatable assembly and it is therefore a priority to provide power to the pump to prevent overheating or a hot landing. At 1212, the method may include determining if the rotatable assembly is spinning at high frequency (e.g., higher than 50 Hz, which in some examples may include the high frequency of 180 Hz or 145 Hz as explained above). If the rotatable assembly is spinning at a high frequency, the method 1200 may include initiating an energy recovery sequence at 1214. The energy recovery sequence may be similar to the energy recovery sequence explained above and may include converting kinetic energy of the rotatable assembly as the rotatable assembly slows down to electrical energy that may be stored in the energy storage circuit 342. If at 1212 the rotatable assembly is not spinning at high frequency, the method may proceed to 1216. At 1216, the method includes spinning the rotatable assembly at low frequency (such as the low frequency of 50 Hz) using the stored energy in the energy storage circuit. Continuing to spin the rotatable assembly at low frequency with the pump powered on may prevent a hot landing by keeping the liquid metal inside the LMB moving while the LMB is cooled by the coolant circuit to prevent the bearing sleeve of the rotatable assembly fusing to the stationary shaft.

At 1218, the method may include evaluating if the rotatable assembly temperature is less than a threshold temperature. A hot landing is more likely to occur when the rotatable assembly temperature is high and less likely to occur when the rotatable assembly temperature is low. The threshold temperature may represent a temperature that is low enough that a rotatable assembly at the threshold temperature is unlikely to cause a hot landing. If the rotatable assembly temperature is under the threshold temperature, the method 1200 may include terminating the energy supply to the motor and allowing the rotatable assembly to coast down at 1220. Terminating power to the motor may include terminating power to the stator that rotates the rotatable assembly and allowing the rotatable assembly to slow to a stop under the influence of frictional forces. The pump may remain active as the rotatable assembly coasts down to provide active cooling to the rotatable assembly and LMB. At 1222, the pump may be deactivated once the rotatable assembly comes to a stop and the method ends.

However, if at 1218 the rotatable assembly temperature is greater than the threshold temperature, the method 1200 may proceed to 1224. At 1224, the method may include evaluating if the remaining stored energy in the energy storage circuit is less than an energy threshold. The energy threshold may represent an amount of energy to run the pump during the amount of time it takes a rotatable assembly to coast down to a stop. If the remaining stored energy is greater than the energy threshold, the method 1200 may proceed to 1216 to continue to spin the rotatable assembly at the low frequency using the stored energy in the energy storage circuit. If the remaining stored energy is less than the threshold energy, the method may include terminating the energy supply to the motor and allowing the rotatable assembly to coast down to a stop at 1226. During the time the rotatable assembly is coasting down, power is still being supplied to the pump to provide active cooling during the coast down process. At 1228, the method 1200 may include supplying power to the pump as long as possible until the stored energy in the energy storage circuit runs out. Using the remaining stored energy to run the pump for as long as possible maximizes the ability of the system to cool the rotatable assembly and prevent hot landings. Method 1200 then ends.

Thus, method 1200 provides for X-ray tube operation according to a first energy recovery strategy that includes recovering the energy from the rotatable assembly after every exposure and storing the energy in the energy storage circuit to be reused for the next ramp-up of the rotatable assembly or if power loss occurs. In case of power outage, the stored energy in the energy storage circuit may be used to keep the rotatable assembly spinning at 50 Hz or lower frequency. This approach allows for "tube peak power demand shaving" by storing the energy during ramp down of the rotatable assembly and re-using the energy during ramp up, the additional power demand for acceleration is greatly decreased leading to an additional energy savings and reduced electrical stress and electromagnetic interference/compatibility generation on the power chain subsystems of the X-ray tube and associated components.

As explained previously, the CT systems described herein may be operated according to a second energy recovery strategy, which is shown in the plots of FIGS. 13 and 14 and illustrated in the flow chart of FIGS. 15A and 15B. FIG. 13 is a time domain plot 1300 showing the rotatable assembly speed, recovered and stored energy, pump operation, and power flow into the motor in a CT system, such as CT system 300, CT system 400, or CT system 500 operating when power is supplied to the imaging system from the main power supply and energy recovery is performed according to the second energy recovery strategy. The second energy recovery strategy may involve only recovering energy during a power loss. A first subplot 1302 includes a first curve 1310 which represents the rotatable assembly speed of a rotatable assembly (e.g., rotatable assembly 327) over time, a second subplot 1304 includes a second curve 1312 which represents the amount of energy recovered from the rotatable assembly by the energy recovery, storage, and distribution system, stored in the energy recovery, storage, and distribution system (e.g., in the energy storage circuit 342), and depleted from the energy recovery, storage, and distribution system, a third subplot 1306 includes a third curve 1314 which represents the activity of a tube pump (e.g., tube pump 328) over time, and a fourth subplot 1308 includes a fourth curve 1316 that represents the amount of power being directed into the motor from a main power supply (shown by the dotted line portions of the fourth curve 1316) and the energy recovery, storage, and distribution system (shown by the solid line portions of the fourth curve 1316). Each of first subplot 1302, second subplot 1304, and fourth subplot 1308 includes respective values (e.g., of rotatable assembly speed, energy, and power flow) increasing along the y-axis and the third subplot 1306 shows pump operation as binary (on/off). Each of the subplots are time-aligned and time points of interest are marked with dashed lines.

Before T1, an X-ray exposure has ended and the rotatable assembly speed decreases over time, as shown in the portion of the first curve 1310 that decreases over time before T1. The rotatable assembly speed may reach a predetermined low frequency, such as 50 Hz at T1. Power may be supplied to the motor at a decreasing rate before T1 to power the rotatable assembly to rotate at lower frequencies over time as shown by the negatively sloped section of the fourth curve 1316. At T1 the supply of power to the motor is sustained at a low level to maintain the low frequency rotation of the rotatable assembly, as shown by the level section of the fourth curve 1316. No energy is recovered during the ramp down process described above, and so the second curve 1312 remains at zero before and after T1. The tube pump remains on during the entire process, which allows the X-ray tube to be cooled. The tube pump is controlled according to a cooling strategy demanded by the first pump system 410 (as appreciated by third curve 1314, which indicates via the hatched lines that the pump is being controlled by the first pump system 410), and power flow to the motor is from the main power supply, such as a connection to an electrical grid, as appreciated by the dashed lines of fourth curve 1316.

As explained previously, the second energy recovery strategy only recovers energy from the rotatable assembly in response to a power loss of the main power supply. If power loss were to occur during an exposure when the rotatable assembly is spinning at the high frequency, sufficient energy may be recovered to power the rotatable assembly at the low frequency and operate the pump to cool the rotatable assembly and LMB and avoid a hot landing. As such, energy recovery and distribution following a power loss during an exposure may be performed the same in the second energy recovery a strategy as in the first energy recovery strategy. However, because energy from the rotatable assembly is not recovered after each exposure, the energy stored in the energy storage circuit may be zero at any given time. As such, if a power loss were to occur after an exposure, while the rotatable assembly is spinning down or while the rotatable assembly is operated at the low frequency, insufficient energy may be available to continue to operate the rotatable assembly and pump. As such, the ramp down of the rotatable assembly following an exposure may be significantly slower according to the second energy recovery strategy than the first energy recovery strategy and the rotatable assembly is kept at a rotational speed sufficient to provide the energy for avoiding a hot landing if power loss occurs. In some examples, the speed of the rotatable assembly may be adjusted during the ramp down following the exposure based on the temperature of the LMB.

FIG. 14 is a time domain plot 1400 showing the rotatable assembly speed, recovered and stored energy, pump operation, and power flow into the motor in the CT system of FIG. 13, but showing a power loss following an exposure. A first subplot 1402 includes a first curve 1410 which represents the rotatable assembly speed over time, a second subplot 1404 includes a second curve 1412 which represents the amount of energy recovered from the rotatable assembly by the energy recovery, storage, and distribution system, stored in the energy recovery, storage, and distribution system, and depleted from the energy recovery, storage, and distribution system, a third subplot 1406 includes a third curve 1414 which represents the activity of the tube pump over time, and a fourth subplot 1408 includes a fourth curve 1416 that represents the amount of power being directed into the motor from the main power supply (shown by the dotted line portions of the fourth curve 1416) and the energy recovery, storage, and distribution system (shown by the solid line portions of the fourth curve 1416). Each of first subplot 1402, second subplot 1404, and fourth subplot 1408 includes respective values (e.g., of rotatable assembly speed, energy, and power flow) increasing along the y-axis and the third subplot 1406 shows pump operation as binary (on/off). Each of the subplots are time-aligned and time points of interest are marked with dashed lines.

Before T1, the rotatable assembly is ramping down following termination of an X-ray exposure. The rotatable assembly is rotated at a decreasing frequency, represented by the negative slope of the section of the first curve 1410 before T1. No energy is recovered, which is shown by the horizontal section of the second curve 1412 before T1, and a decreasing amount of power flows into the motor to rotate the rotatable assembly at the decreasing speed, which is shown on by the negative slope of the section of the fourth curve 1416 before T1. The tube pump is activated, as shown by the constant, hatched portion of the third curve 1414 before T1, which allows the X-ray tube to be cooled. The tube pump is controlled according to a cooling strategy demanded by the first pump system 410 (as appreciated by third curve 1414, which indicates via the hatched lines that the pump is being controlled by the first pump system 410), and power flow to the motor is from the main power supply, such as a connection to an electrical grid, as appreciated by the dashed lines of fourth curve 1416.

At T1, a power outage occurs and an energy recovery process begins. The rotatable assembly is slowed to a low frequency, such as 50 Hz, which is shown by the negative slope of the section of the first curve 1410 between T1 and T2. Mechanical energy recovered from the slowing rotatable assembly is transformed into electrical energy and stored in the energy storage circuit which is shown by the positive slope of the section of the second curve 1412 between T2 and T1. At T1 (or as soon as sufficient energy is available in the energy storage circuit), the pump power source changes and the pump activity is powered by the energy storage circuit. The change in power source is represented by the portion of the third curve 1414 after T1 that does not include a fill pattern. The pump activity remains constant, and pump function is not lost during the power outage, at least in some examples. The recovered energy is represented by the negative portion of the fourth curve 1416 between T1 and T2.

After T2, the rotatable assembly is rotated at low frequency and the pump is operated by the energy stored in the energy storage circuit between T1 and T2. During this period, the amount of energy in the energy storage circuit decreases, shown on the second subplot 1404 by the decreasing section of the second curve 1412 between T2 and T3 may be linear. The amount of power used to rotate the rotatable assembly is shown as the horizontal section of the fourth curve 1416 between T2 and T4

At T3, the energy within the energy storage circuit reaches a lower threshold, which may indicate that insufficient energy is left in the energy storage circuit to power both the motor and the tube pump. As such, the power supplied to the motor from the energy storage circuit is terminated and the power supplied to the motor decreases to 0 at T3. At T3, no more power is supplied to rotate the rotatable assembly and the rotatable assembly speed ramps down, shown on first subplot 1402 by the decreasing section of the first curve 1410 between T3 and T4. Because the energy storage circuit is only supplying power to the tube pump between T3 and T4, the rate at which the energy in the energy storage circuit is consumed is lower between T3 and T4 relative to between T2 and T3. At T4, the rotatable assembly speed reaches 0. The pump remains active until the rotatable assembly speed reaches 0.

Turning now to FIGS. 15A and 15B, they show a method 1500 for controlling the operation of an energy recovery, storage, and distribution system such as the energy storage circuit 342, a cooling pump such as tube pump 328, and a motor such as motor 321 in order to recover energy from the motor following a power outage. Method 1500 may be carried out according to instructions stored in memory of one or more controllers or computing devices included as part of and/or operatively coupled to a CT imaging system, such as CT system 300, CT system 400, or CT system 500. At 1502, the method 1500 may include operating the X-ray tube to perform an exam in accordance with scan parameters. The scan parameters may include the number of exposures to be performed during the exam, the length of each exposure, the voltage and/or current of the X-ray tube for each exposure, and/or other parameters. Operating the X-ray tube to perform the exam may include rotating the target of the X-ray tube with the rotatable assembly and transferring resulting heat from an exposure to the LMB of the rotatable assembly, as indicated at 1504. The target may be rotated to distribute thermal energy from electrons striking the target during an exposure to a focal band comprised of a plurality of positions on the target as the target rotates rather than a single focal point. Further, heat may be generated as the rotatable assembly rotates due to friction and as a product of the motor operation that rotates the rotatable assembly. Operating the X-ray tube to perform the exam may further include operating the pump to cool the rotatable assembly and the LMB, as indicated at 1506. The pump may be a component of a coolant circuit and directs a coolant to flow through the coolant circuit to make thermal contact with the LMB and rotatable assembly to absorb excess heat from the LMB and rotatable assembly. The coolant may be circulated by the pump to a heat exchanger where the temperature of the coolant is reduced.

At 1508, the method 1500 may include identifying if a power loss has occurred. Identifying if a power loss has occurred may include identifying a loss of power from the main power supply, such as via monitoring a current through one or both of the inverters or other mechanism. The main power supply may stop supplying power in the event of a power outage or due to an operator turning off the CT system, for example. Monitoring for the power loss may occur through the duration of the scan, as a power loss can be identified at any time within a scan. If a power loss is detected, the method 1500 proceeds to 1509, which is explained in more detail below, and if a power loss is not detected, the method proceeds to 1528, which is included in FIG. 15B. A power loss can occur at any point of the method 1500 and if a power loss is identified at any point in a scan, the method 1500 may include immediately proceeding to 1509 from the point in the method 1500 where the power loss was detected.

At 1528, the method 1500 may include determining if an exposure has been requested. An exposure request may be input by a healthcare provider or it may originate from a controller integrated into the CT system. If an exposure has not been requested, the method 1500 continues at 1546 and if an exposure has been requested, the method 1500 continues at 1530, which will be described in more detail below. At 1546, the method 1500 may include determining if the rotatable assembly is spinning above a low frequency threshold. The low frequency threshold may be 50 Hz, as explained previously. If at 1546 the rotatable assembly is not spinning above the low frequency, the method 1500 continues at 1542. If at 1546 the rotatable assembly is spinning above low frequency, at 1548 the temperature and energy of the rotatable assembly may be evaluated. The evaluation may be accomplished by temperature and frequency sensors coupled to the rotatable assembly. At 1550, the rotatable assembly energy is evaluated to determine if enough energy could be recovered to cool the rotatable assembly if a power outage were to occur. If there is sufficient energy at 1550, the method 1500 may include proceeding to 1542, described below with more detail. If there is insufficient energy at 1550, the method may include accelerating the rotatable assembly at 1552. Accelerating the rotatable assembly may include issuing a command to a power source coupled to the motor, such as the RCB 338. The rotatable assembly may be accelerated to a new set frequency that may be calculated based on the temperature of the rotatable assembly. The method 1500 may proceed from 1552 to 1548 to determine if the rotatable assembly has been accelerated to a suitable speed.

Returning to 1528, if an exposure request has been detected, method 1500 proceeds to 1530, which may include predicting the temperature of the target after an exposure occurs. The target may be an anode within the X-ray tube and that may be coupled/included as part of the rotatable assembly. When an X-ray exposure occurs, electrons strike the target, which produces X-rays and heat. The change in temperature of the target may be predicted based on a plurality of factors including the duration of the X-ray exposure, the intensity of the X-ray beam striking the target (which may be based on the X-ray tube current), efficiency of the coolant circuit coupled to the rotatable assembly, and the current temperature of the rotatable assembly and target.

At 1532, the method may include calculating the amount of energy specified to spin the rotatable assembly at the low frequency if power is lost. This calculation may be based on the amount of time it would take to cool the rotatable assembly from its current temperature to a temperature that poses a low risk for a hot landing, as well as the amount of energy to power the tube pump while the rotatable assembly cools. At 1534, the method 1500 may include determining the rotatable assembly speed demanded to recover the amount of energy calculated at 1532 if a power loss occurs. Determining the rotatable assembly speed may include a calculation that accounts for losses in energy between the rotatable assembly and the energy storage circuit and the amount of kinetic energy the rotatable assembly has depending on the rotational speed of the rotatable assembly.

At 1536, the method may include determining if the determined rotatable assembly speed is greater than a maximum rotatable assembly speed. The maximum rotatable assembly speed may be based on the limits of the motor as well as limits of the target. If the determined rotatable assembly speed is less than or equal to the maximum rotatable assembly speed, the method 1500 may include spinning the rotatable assembly at the determined speed at 1554. The method 1500 may continue from 1554 to 1540. If the determined rotatable assembly speed is greater than the maximum rotatable assembly speed at 1536, the method 1500 may include spinning the rotatable assembly at the maximum rotatable assembly speed at 1538 before proceeding to 1540.

At 1540, the method may include performing the exposure. The exposure may include an X-ray generator powering the X-ray tube to accelerate a beam of electrons towards a rotating target. The electrons may produce X-rays as they strike the target, which may be directed through a subject and detected by a detector to image the subject. In a CT system such as the CT system 400 described with respect to FIG. 4, the X-ray generator and tube may be integrated into a rotating gantry, and the X-ray generator, X-ray tube, X-ray detector, and associated power electronics may be rotated during an exposure. Performing the exposure may additionally include, upon conclusion of the exposure, supplying power to the motor to spin the rotatable assembly at a rate that ensures sufficient energy can be recovered to spin the rotatable assembly at the low frequency and operate the pump should a power loss occur. As shown in FIG. 13, following conclusion of an exposure, rather than terminating the power supply to the motor to ramp the rotatable assembly down to the low frequency, the rotatable assembly may be slowed gradually at a rate that is based on the temperature of the LMB, for example, so that enough energy can be recovered to cool the LMB via rotating the rotatable assembly and operating the pump in the event of a power loss. The process of ramping down the rotatable assembly speed may be performed similarly to the process explained above with respect to 1548, 1550, and 1552 of method 1500, explained above. At 1542, the method 1500 may include determining if the exam has been terminated (e.g., concluded). The exam may be terminated/concluded if all exposures of the subject have been performed. If at 1542 the exam has not been terminated, the method 1500 may continue at 1502. The method may continue from 1502 in the manner described above. If the exam has been terminated at 1542, the method 1500 may include, at 1543, determining if a request to power down the CT system has been received. If a request to power down the CT system has not been received at 1543, the CT system may remain operative and ready for a successive scan by the method 1500 proceeding to 1502. If a request to power down the CT system has been received at 1543, the method 1500 may proceed to 1544. At 1544, the method 1500 may include spinning the rotatable assembly and operating the pump until indicated and then allowing the rotatable assembly to coast down and deactivating the pump at 1544. The rotatable assembly and the pump may be indicated to stop if the rotatable assembly temperature has reached a low temperature threshold and a hot landing is unlikely to occur if the rotatable assembly coasts down at its current temperature. Coasting down the rotatable assembly may include letting the speed of the rotatable assembly decrease over time to a stop, and may be accomplished by no longer providing power to the motor. It is to be appreciated that upon termination of the exam, if a new exam is started, method 1500 may loop back to 1502 to initiate the next exam, which may occur without the rotatable assembly coming to a complete stop in some examples.

Returning to 1508 of FIG. 15A, if a power loss is detected at 1508, the method 1500 may include, at 1509, activating the tube pump using the recovered/stored energy, which may be stored in an energy storage circuit such as energy storage circuit 342 from FIG. 3. At 1510, method 1500 includes initiating energy recovery from the rotatable assembly. If the power loss occurs during an exposure or during ramp-down of the rotatable assembly following an exposure, energy from the rotatable assembly may be recovered while the rotatable assembly spins down to the low frequency threshold. At 1512, the method may include using the energy stored in the stored energy circuit to power the motor to rotate the rotatable assembly at a low frequency, such as 50 Hz. At 1514, the method may include determining if the rotatable assembly temperature is less than a threshold temperature. The threshold temperature may be a temperature under which the risk of a hot landing is low. If the rotatable assembly temperature is less than the threshold temperature, the method 1500 may include terminating the energy supply to the motor and allowing the rotatable assembly to coast down at 1516. Terminating power to the motor may include terminating power to the stator that rotates the rotatable assembly and allowing the rotatable assembly to slow to a stop under the influence of frictional forces. The pump may remain active as the rotatable assembly coasts down to provide active cooling to the rotatable assembly and LMB. At 1518, the pump may be deactivated once the rotatable assembly comes to a stop and the method ends.

If at 1514 the rotatable assembly temperature is greater than or equal to the threshold temperature, the method 1500 may include, at 1520, determining if the remaining stored energy in the energy storage circuit is less than an energy threshold. The energy threshold may represent an amount of energy to run the pump during the amount of time it takes a rotatable assembly to coast down to a stop. If the remaining stored energy is greater than the energy threshold, the method 1500 may proceed to 1522 to continue to spin the rotatable assembly at the low frequency using the stored energy. If the remaining stored energy is less than or equal to the energy threshold, the method may include terminating the energy supply to the motor and allowing the rotatable assembly to coast down to a stop at 1522. During the time the rotatable assembly is coasting down, power is still being supplied to the pump to provide active cooling during the coast down process. At 1524, the method 1500 may include supplying power to the pump as long as possible until the stored energy runs out. Using the remaining stored energy to run the pump for as long as possible maximizes the ability of the system to cool the rotatable assembly and prevent hot landings.

The technical effect of the disclosed self-contained hot landing protection system is the prevention of hot landings by recovering energy from a rotatable assembly as it slows and storing that energy to be used to power the motor and the tube pump in the event of a power outage. The motor may be powered to maintain rotation of the rotatable assembly at low speeds and the tube pump may be powered on to cool the rotatable assembly. Rotating the rotatable assembly at low speeds and cooling the rotatable assembly using the stored recovered energy prevents the rotatable assembly from suddenly stopping at high temperatures, which may cause the sleeve within the rotatable assembly to fuse to the shaft, which may be referred to as a hot landing. Additionally, recovering energy from the rotating rotatable assembly facilitates energy saving and reduces the amount of power from external sources demanded to run the motor.

Though a computed tomography (CT) system is described by way of example, it should be understood that the present techniques may also be useful when applied to other X-ray imaging modalities, such as X-ray angiography systems, X-ray tomosynthesis systems, X-ray mammography systems, X-ray fluoroscopy systems, X-ray interventional systems, X-ray C-arm systems, etc. The present discussion of a CT imaging modality is provided merely as an example of one suitable imaging modality.

The disclosure also provides support for a method for an X-ray tube of an imaging system, the method comprising: during a scan of a subject with the imaging system, supplying energy from a main power supply to the X-ray tube in order to rotate a target of the X-ray tube, selectively recovering energy from the X-ray tube and storing the recovered energy in an energy storage circuit of the imaging system, and detecting a loss of the main power supply, and in response, supplying energy from the energy storage circuit to the X-ray tube in order to rotate the target at a threshold speed. In a first example of the method, supplying energy from the main power supply to the X-ray tube in order to rotate the target of the X-ray tube comprises supplying energy from the main power supply to a motor coupled to the target. In a second example of the method, optionally including the first example, selectively recovering energy from the X-ray tube comprises recovering energy from the motor responsive to detecting the loss of the main power supply. In a third example of the method, optionally including one or both of the first and second examples, selectively recovering energy from the X-ray tube comprises recovering energy from the motor during a ramp-down of the motor following termination of a first exposure with the X-ray tube. In a fourth example of the method, optionally including one or more or each of the first through third examples, the first exposure includes supplying energy from the main power supply to the X-ray tube in order to rotate the target at an operating speed, the operating speed higher than the threshold speed, and wherein during the ramp-down, the energy from the main power supply is not supplied to the motor. In a fifth example of the method, optionally including one or more or each of the first through fourth examples, the method further comprises: receiving a request to initiate a second exposure with the X-ray tube, and in response, supplying energy from the energy storage circuit to the motor to rotate the target to the operating speed. In a sixth example of the method, optionally including one or more or each of the first through fifth examples, the method further comprises, in response to detecting the loss of the main power supply, supplying energy from the energy storage circuit to a pump configured to supply coolant to the X-ray tube. In a seventh example of the method, optionally including one or more or each of the first through sixth examples, the method further comprises: supplying energy from the energy storage circuit to the X-ray tube in order to rotate the target at the threshold speed until a temperature of the X-ray tube reaches a threshold temperature or until an amount of energy stored in the energy storage circuit reaches a threshold energy, and then terminating the supplying of the energy to the X-ray tube. In an eighth example of the method, optionally including one or more or each of the first through seventh examples, the method further comprises: supplying energy from the energy storage circuit to the pump until the target stops rotating, and then terminating the supplying of the energy to the pump.

The disclosure also provides support for a computed tomography (CT) imaging system, comprising: an X-ray tube including a rotatable assembly, the rotatable assembly including a target and a rotor of a motor, an energy storage circuit coupled to the motor, memory storing instructions, and one or more processors configured to execute the instructions to: responsive to a loss of a main power supply to the motor, convert rotational energy of the rotatable assembly to electrical energy as the rotatable assembly spins following the loss of the main power supply, the electrical energy stored in the energy storage circuit, and supply the electrical energy stored in the energy storage circuit to the motor to continue to spin the rotatable assembly at a threshold speed for a duration. In a first example of the system, the system further comprises: a coolant circuit including a pump configured to supply coolant to the motor, and wherein the one or more processors are configured to execute the instructions to, responsive to the loss of the main power supply, supply energy the electrical energy from the energy storage circuit to the pump. In a second example of the system, optionally including the first example, the one or more processors are configured to execute the instructions to, after the duration, terminate the supplying of the electrical energy from the energy storage circuit to the motor and continue supplying the electrical energy from the energy storage circuit to the pump until the rotatable assembly stops rotating, and then terminate the supplying of the electrical energy to the pump. In a third example of the system, optionally including one or both of the first and second examples, the duration is based on a temperature of the motor and/or or an amount of energy stored in the energy storage circuit. In a fourth example of the system, optionally including one or more or each of the first through third examples, the system further comprises: a power distribution unit configured to supply electrical energy from the main power supply to the motor via a power path that bypasses the energy storage circuit. In a fifth example of the system, optionally including one or more or each of the first through fourth examples, the system further comprises: an uninterruptible power supply coupled to the power distribution unit and configured to, responsive to the loss of the main power supply, supply electrical energy to a detector system of the CT imaging system and/or to one or more off-gantry devices of the CT imaging system.

The disclosure also provides support for a computed tomography (CT) imaging system, comprising: an X-ray tube including a target, a motor including a rotor coupled to the target and a liquid metal bearing (LMB), the target, the rotor, and a sleeve of the LMB forming a rotatable assembly, an energy storage circuit coupled to the motor, a coolant circuit coupled to the motor and including a pump, memory storing instructions, and one or more processors configured to execute the instructions to: during a first exposure, supply electrical energy from a main power supply to the motor in order to rotate the rotatable assembly at an operating speed, and supply electrical energy from the main power supply to the pump to cool the motor, responsive to termination of the first exposure, convert rotational energy of the rotatable assembly to electrical energy as the rotatable assembly continues to rotate following termination of the first exposure, the electrical energy stored in the energy storage circuit, and responsive to initiation of a second exposure, supply the electrical energy stored in the energy storage circuit to the motor to increase a rotational speed of the rotatable assembly to the operating speed. In a first example of the system, the one or more processors are further configured to execute the instructions to, responsive to a loss of the main power supply to the motor during the second exposure: supply electrical energy from the energy storage circuit to the pump, convert rotational energy of the rotatable assembly to electrical energy as the rotatable assembly continues to rotate following the loss of the main power supply, the electrical energy stored in the energy storage circuit, and once a speed of the rotatable assembly reaches a lower threshold speed, supply the electrical energy stored in the energy storage circuit to the motor to maintain the speed of the rotatable assembly at the lower threshold speed. In a second example of the system, optionally including the first example, the one or more processors are further configured to execute the instructions to supply electrical energy from the main power supply to the motor in order to rotate the rotatable assembly at the lower threshold speed during a period between the first exposure and the second exposure. In a third example of the system, optionally including one or both of the first and second examples, the one or more processors are further configured to execute the instructions to, after a duration, terminate the supplying of the electrical energy from the energy storage circuit to the motor and continue supplying the electrical energy from the energy storage circuit to the pump until the rotatable assembly stops rotating, and then terminate the supplying of the electrical energy to the pump. In a fourth example of the system, optionally including one or more or each of the first through third examples, the duration is based on a temperature of the motor and/or or an amount of energy stored in the energy storage circuit.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A method for an X-ray tube of an imaging system, the method comprising:

during a scan of a subject with the imaging system, supplying energy from a main power supply to the X-ray tube in order to rotate a target of the X-ray tube;

selectively recovering energy from the X-ray tube and storing the recovered energy in an energy storage circuit of the imaging system; and detecting a loss of the main power supply, and in response, supplying energy from the energy storage circuit to the X-ray tube in order to rotate the target at a threshold speed.

2. The method of claim 1, wherein supplying energy from the main power supply to the X-ray tube in order to rotate the target of the X-ray tube comprises supplying energy from the main power supply to a motor coupled to the target.

3. The method of claim 2, wherein selectively recovering energy from the X-ray tube comprises recovering energy from the motor responsive to detecting the loss of the main power supply.

4. The method of claim 2, wherein selectively recovering energy from the X-ray tube comprises recovering energy from the motor during a ramp-down of the motor following termination of a first exposure with the X-ray tube.

5. The method of claim 4, wherein the first exposure includes supplying energy from the main power supply to the X-ray tube in order to rotate the target at an operating speed, the operating speed higher than the threshold speed, and wherein during the ramp-down, the energy from the main power supply is not supplied to the motor.

6. The method of claim 5, further comprising receiving a request to initiate a second exposure with the X-ray tube, and in response, supplying energy from the energy storage circuit to the motor to rotate the target to the operating speed.

7. The method of claim 1, further comprising, in response to detecting the loss of the main power supply, supplying energy from the energy storage circuit to a pump configured to supply coolant to the X-ray tube.

8. The method of claim 7, further comprising supplying energy from the energy storage circuit to the X-ray tube in order to rotate the target at the threshold speed until a temperature of the X-ray tube reaches a threshold temperature or until an amount of energy stored in the energy storage circuit reaches a threshold energy, and then terminating the supplying of the energy to the X-ray tube.

9. The method of claim 8, further comprising supplying energy from the energy storage circuit to the pump until the target stops rotating, and then terminating the supplying of the energy to the pump.

10. A computed tomography (CT) imaging system, comprising:

an X-ray tube including a rotatable assembly, the rotatable assembly including a target and a rotor of a motor;

an energy storage circuit coupled to the motor;

memory storing instructions; and one or more processors configured to execute the instructions to:

responsive to a loss of a main power supply to the motor, convert rotational energy of the rotatable assembly to electrical energy as the rotatable assembly spins following the loss of the main power supply, the electrical energy stored in the energy storage circuit; and supply the electrical energy stored in the energy storage circuit to the motor to continue to spin the rotatable assembly at a threshold speed for a duration.

11. The CT imaging system of claim 10, further comprising a coolant circuit including a pump configured to supply coolant to the motor, and wherein the one or more processors are configured to execute the instructions to, responsive to the loss of the main power supply, supply energy the electrical energy from the energy storage circuit to the pump.

12. The CT imaging system of claim 11, wherein the one or more processors are configured to execute the instructions to, after the duration, terminate the supplying of the electrical energy from the energy storage circuit to the motor and continue supplying the electrical energy from the energy storage circuit to the pump until the rotatable assembly stops rotating, and then terminate the supplying of the electrical energy to the pump.

13. The CT imaging system of claim 12, wherein the duration is based on a temperature of the motor and/or or an amount of energy stored in the energy storage circuit.

14. The CT imaging system of claim 10, further comprising a power distribution unit configured to supply electrical energy from the main power supply to the motor via a power path that bypasses the energy storage circuit.

15. The CT imaging system of claim 14, further comprising an uninterruptible power supply coupled to the power distribution unit and configured to, responsive to the loss of the main power supply, supply electrical energy to a detector system of the CT imaging system and/or to one or more off-gantry devices of the CT imaging system.

16. A computed tomography (CT) imaging system, comprising:

an X-ray tube including a target;

a motor including a rotor coupled to the target and a liquid metal bearing (LMB), the target, the rotor, and a sleeve of the LMB forming a rotatable assembly;

an energy storage circuit coupled to the motor;

a coolant circuit coupled to the motor and including a pump;

memory storing instructions; and one or more processors configured to execute the instructions to:

during a first exposure, supply electrical energy from a main power supply to the motor in order to rotate the rotatable assembly at an operating speed, and supply electrical energy from the main power supply to the pump to cool the motor;

responsive to termination of the first exposure, convert rotational energy of the rotatable assembly to electrical energy as the rotatable assembly continues to rotate following termination of the first exposure, the electrical energy stored in the energy storage circuit; and responsive to initiation of a second exposure, supply the electrical energy stored in the energy storage circuit to the motor to increase a rotational speed of the rotatable assembly to the operating speed.

17. The CT imaging system of claim 16, wherein the one or more processors are further configured to execute the instructions to, responsive to a loss of the main power supply to the motor during the second exposure:

supply electrical energy from the energy storage circuit to the pump;

convert rotational energy of the rotatable assembly to electrical energy as the rotatable assembly continues to rotate following the loss of the main power supply, the electrical energy stored in the energy storage circuit; and once a speed of the rotatable assembly reaches a lower threshold speed, supply the electrical energy stored in the energy storage circuit to the motor to maintain the speed of the rotatable assembly at the lower threshold speed.

18. The CT imaging system of claim 17, wherein the one or more processors are further configured to execute the instructions to supply electrical energy from the main power supply to the motor in order to rotate the rotatable assembly at the lower threshold speed during a period between the first exposure and the second exposure.

19. The CT imaging system of claim 18, wherein the one or more processors are further configured to execute the instructions to, after a duration, terminate the supplying of the electrical energy from the energy storage circuit to the motor and continue supplying the electrical energy from the energy storage circuit to the pump until the rotatable assembly stops rotating, and then terminate the supplying of the electrical energy to the pump.

20. The CT imaging system of claim 19, wherein the duration is based on a temperature of the motor and/or or an amount of energy stored in the energy storage circuit.

* * * * *